(12) United States Patent
Silver et al.

(10) Patent No.: US 7,751,802 B2
(45) Date of Patent: Jul. 6, 2010

(54) SYSTEMS, METHODS AND COMPUTER PROGRAM PRODUCTS FOR OBTAINING RESPONSES TO ANNOUNCEMENT FILES

(75) Inventors: Edward M. Silver, Atlanta, GA (US); Sharon E. Carter, Austell, GA (US); Darryl C. Moore, Conyers, GA (US); Robert Starr, Decatur, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 1065 days.

(21) Appl. No.: 11/377,804

(22) Filed: Mar. 16, 2006

(65) Prior Publication Data
US 2007/0220096 A1 Sep. 20, 2007

(51) Int. Cl.
*H04M 1/725* (2006.01)
*G06F 15/16* (2006.01)
*G06Q 30/00* (2006.01)

(52) U.S. Cl. .................... 455/412.2; 709/206; 705/26
(58) Field of Classification Search .................... 705/14, 705/26, 78; 707/1, 104; 709/204, 206, 218, 709/219, 229; 455/412.2
See application file for complete search history.

(56) References Cited

U.S. PATENT DOCUMENTS

| | | | |
|---|---|---|---|
| 5,862,325 A | 1/1999 | Reed et al. | |
| 5,884,039 A | 3/1999 | Ludwig et al. | |
| 6,532,489 B1* | 3/2003 | Merchant | 709/206 |
| 6,549,767 B1* | 4/2003 | Kawashima | 455/412.2 |
| 6,628,306 B1 | 9/2003 | Marchionda | |
| 6,779,022 B1 | 8/2004 | Horstmann et al. | |
| 6,970,908 B1 | 11/2005 | Larky et al. | |
| 7,006,613 B2 | 2/2006 | Novak et al. | |
| 2002/0049836 A1* | 4/2002 | Shibuya | 709/219 |
| 2002/0138582 A1 | 9/2002 | Chandra et al. | |
| 2002/0143871 A1 | 10/2002 | Meyer et al. | |
| 2002/0152876 A1* | 10/2002 | Hughes et al. | 84/609 |
| 2002/0178137 A1* | 11/2002 | Hasegawa | 707/1 |
| 2003/0036967 A1* | 2/2003 | Deguchi | 705/26 |
| 2003/0149802 A1 | 8/2003 | Curry et al. | |
| 2003/0172116 A1* | 9/2003 | Curry et al. | 709/206 |
| 2003/0177193 A1* | 9/2003 | Budge et al. | 709/206 |
| 2003/0182383 A1* | 9/2003 | He | 709/206 |
| 2004/0002932 A1 | 1/2004 | Horvitz et al. | |
| 2004/0068519 A1* | 4/2004 | Smukler et al. | 707/104.1 |
| 2004/0158607 A1 | 8/2004 | Coppinger et al. | |
| 2004/0172454 A1 | 9/2004 | Appelman et al. | |
| 2005/0033855 A1* | 2/2005 | Moradi et al. | 709/231 |
| 2005/0086255 A1 | 4/2005 | Schran et al. | |

(Continued)

FOREIGN PATENT DOCUMENTS

EP 1206114 A1 * 5/2002

Primary Examiner—Wing F Chan
Assistant Examiner—Jonathan Willis
(74) Attorney, Agent, or Firm—Cantor Colburn LLP

(57) ABSTRACT

A method of obtaining a response to associated announcement files. The method includes associating a first announcement file including an attribute of a tangible item with an email and associating an interactive information file with the email. The email is sent with the associated announcement file and the associated interactive information file to the recipient to a recipient. The announcement file causes presentation of the attribute of the tangible item to the recipient upon receipt of the email by the recipient. The interactive information file causes presentation of the interactive information file to the recipient upon receipt of the email by the recipient.

12 Claims, 21 Drawing Sheets

U.S. PATENT DOCUMENTS

| | | |
|---|---|---|
| 2005/0108336 A1 | 5/2005 | Naick et al. |
| 2005/0256809 A1* | 11/2005 | Sadri .......................... 705/78 |
| 2006/0011472 A1 | 1/2006 | Flick |
| 2006/0116142 A1 | 6/2006 | Cofta |
| 2006/0206713 A1 | 9/2006 | Hickman et al. |
| 2007/0088852 A1 | 4/2007 | Levkovitz |

* cited by examiner

SYSTEMS, METHODS AND COMPUTER PROGRAM PRODUCTS FOR OBTAINING RESPONSES TO ANNOUNCEMENT FILES

BACKGROUND

Embodiments relate to the transfer of electronic information over a computer network, and more particularly, to systems, methods and computer program products for associating sender announcements with electronic transmissions.

Computer operating systems (e.g., Microsoft Windows) have led to the capability of personal computer users being able to keep more than one application program open at the same time. With the advent of high-speed Internet service, one of the applications that many persons find helpful to continue running while busy at other tasks on their desktops is their email application program. Currently, when a new email is received a "ping" tone is often heard to inform the user that a new message has arrived, but then the user must bring the email application program to the top of the desktop to determine the sender, the subject matter, the import, and other attributes of the message. Not until the recipient has opened his email "in box" and examined the email does he know whether it was a wise decision to interrupt his other work for this message. Further, as multiple email messages come in through out the day it becomes inefficient to drop a task to examine the import of each email.

Techniques have been proposed for allowing a user to associate a particular audio file with a particular entry/person in an address book. Thus, distinctive audio files may be used to inform the user of the presence of a new email and to indicate from whom the message was sent without requiring the user to access the email application.

While this technique may be extremely useful in practice, recipient associated announcements are dictated from the recipient's point of view (e.g., a message from a particular source is always urgent). They may be general in nature and do not take into account the changing environment and situations facing email senders.

The sender of an email on the other hand has the timely knowledge of the many circumstances, content, context, necessity and urgency of a reply and many other attributes of an email that might be conveyed with an announcement. Thus, there is a need to take advantage of the sender's real time knowledge of the circumstance surrounding the composition of an email and the sender's ability to gauge the effect of a particular announcement on the recipient.

SUMMARY

Embodiments include a method of obtaining a response to associated announcement files. The method includes associating a first announcement file including an attribute of a tangible item with an email and associating an interactive information file with the email. The email is sent with the associated announcement file and the associated interactive information file to a recipient. The announcement file causes presentation of the attribute of the tangible item to the recipient upon receipt of the email by the recipient. The interactive information file causes presentation of the interactive information file to the recipient upon receipt of the email by the recipient. Embodiments include a computer program product for implementing the method.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

These and other features, aspects, and advantages of the present invention will become better understood when the following detailed description is read with reference to the accompanying figures, wherein.

DETAILED DESCRIPTION

Figure 1:
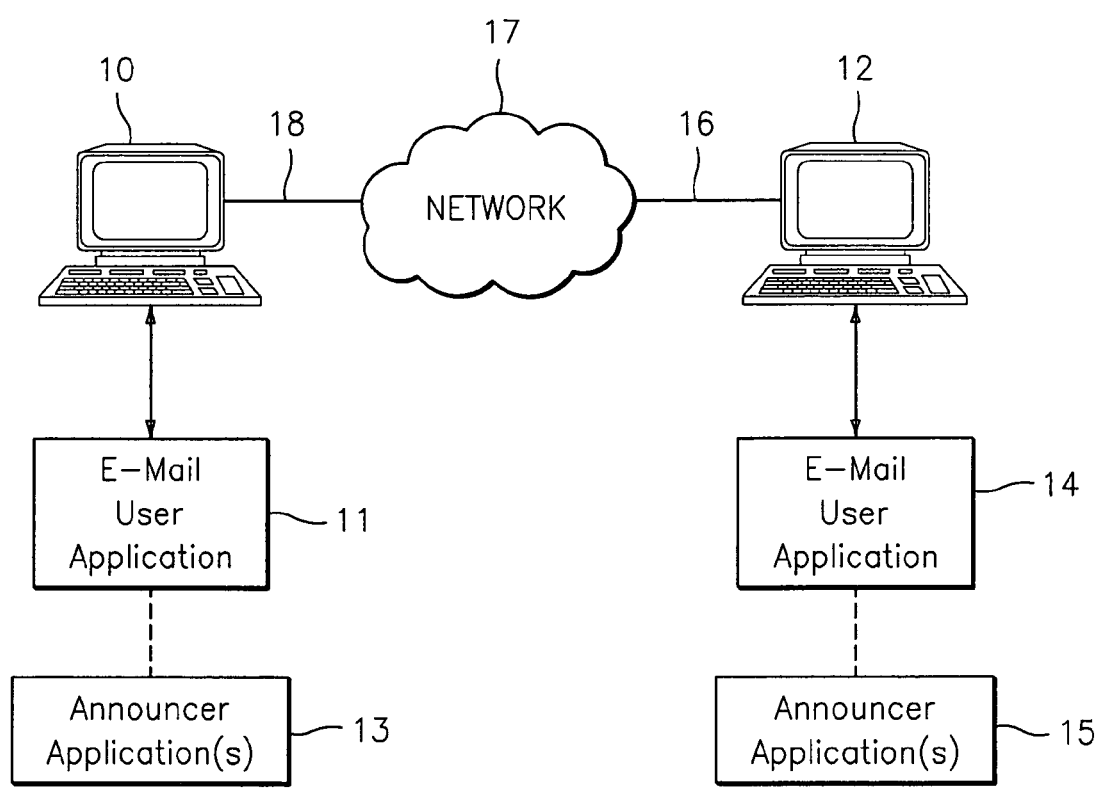
FIG. 1 is a schematic diagram of one implementation of a computer network system in exemplary embodiments.

Exemplary embodiments will now be described in more detail with reference to the figures. FIG. 1 is a schematic diagram of a computer network system 8 in exemplary embodiments. According to an exemplary embodiment, the system 8 comprises at least one computer terminal 10 connected through a network link 18 and a communications network 17 to another computer terminal 12 via another network link 16. Each computer terminal 10, 12 may have a software operating system that runs a number of application programs. The software, including the operating system and the application programs, are stored in the memories of the terminals 10 and 12. Typical application programs would be for word processing, audio and video editing, spread sheets, graphics, and multimedia presentations, etc. A user controls the computer terminals 10, 12 through a user interface, today usually a graphic interface, which he communicates with via a keyboard, mouse or other input device. The term computer terminal in this description is not limited to any specific type of terminal and may include computer systems having many computers, or only a portion of a computer (e.g., thin client), and the associated peripheral devices as are necessary for the operation of the invention. Further, the computer terminals may represent any device that is capable of sending and/or receiving and email such as a PDA, wireless phone, wireless email device, etc.

The network 17 may be in the form of a wired network or a wireless network. The network 17 may be a simple, single communications path, or it may include one or several LANs or WANs, the world wide web, or any combination thereof. The computer terminals 10 and 12 may be the only two terminals connected to the network 17, or alternatively, the network may be shared by many other terminals.

Embodiments are described herein with reference to associating an announcement file with an email message. It is understood that announcement files may be associated with other types of electronic messages, such as text messaging. Thus, embodiments are not limited to email messages, but rather electronic messaging in general.

One of the applications programs the user of computer terminal 10 may call for execution by the operating system is an email application program 11. The email application program 11 allows the user to compose and send electronic communications over the network 17 to the other computer terminal 12. The email application program 11 also receives and displays on the display of terminal 10 email communications received from the terminal 12. On the other hand, the computer terminal 12 has an email application program 14 that is capable of allowing a user to compose and send emails to the computer terminal 10 and to receive and display emails from terminal 10. One existing implementation of the application programs 11, 14 is a program sold under the trademark Outlook by the Microsoft Corporation of Bellview, Wash. As is evident there many other suitable commercially available email application programs which could be used.

Working in concert with each email application program 11, 14 is a corresponding announcer application program 13, 15, respectively. The announcer application program, for example announcer application program 13, supports a process for associating announcement files by a sender with emails he has composed with the email application program 11 and further provides for receiving email and playing announcement files sent from the computer terminal 12. Announcer application program 15 supports a process for associating announcement files by a sender with emails he has composed on the email application program 14 and further provides for receiving email and playing announcement files sent from the terminal 10. As will be more fully explained herein, announcer application programs 13, 15 may be integrated into email application programs 11, 14 or be separate programs enhancing the functionality of the email communications.

Usually, as part of the email application program 11 and as part of the terminal 10, there is a communications interface connected to the network 17 that permits it to send and receive e-mail communications over the network. Similarly, as part of the email application program 14 and as part of the terminal 12, there is a communications interface connected to the network 17 that permits it to send and receive e-mail communications over the network. For the purposes of this specification, the convention will be used that a sender of an e-mail is a user of either terminal 10, terminal 12, or other similar terminal, who composes and sends an electronic communication over the network 17 with or without one or more associated announcement files, and a recipient is a user of either terminal 10, terminal 12, or other similar terminal, who receives and displays an electronic communication with or without one or more associated announcement files from the network 17.

Figure 2:
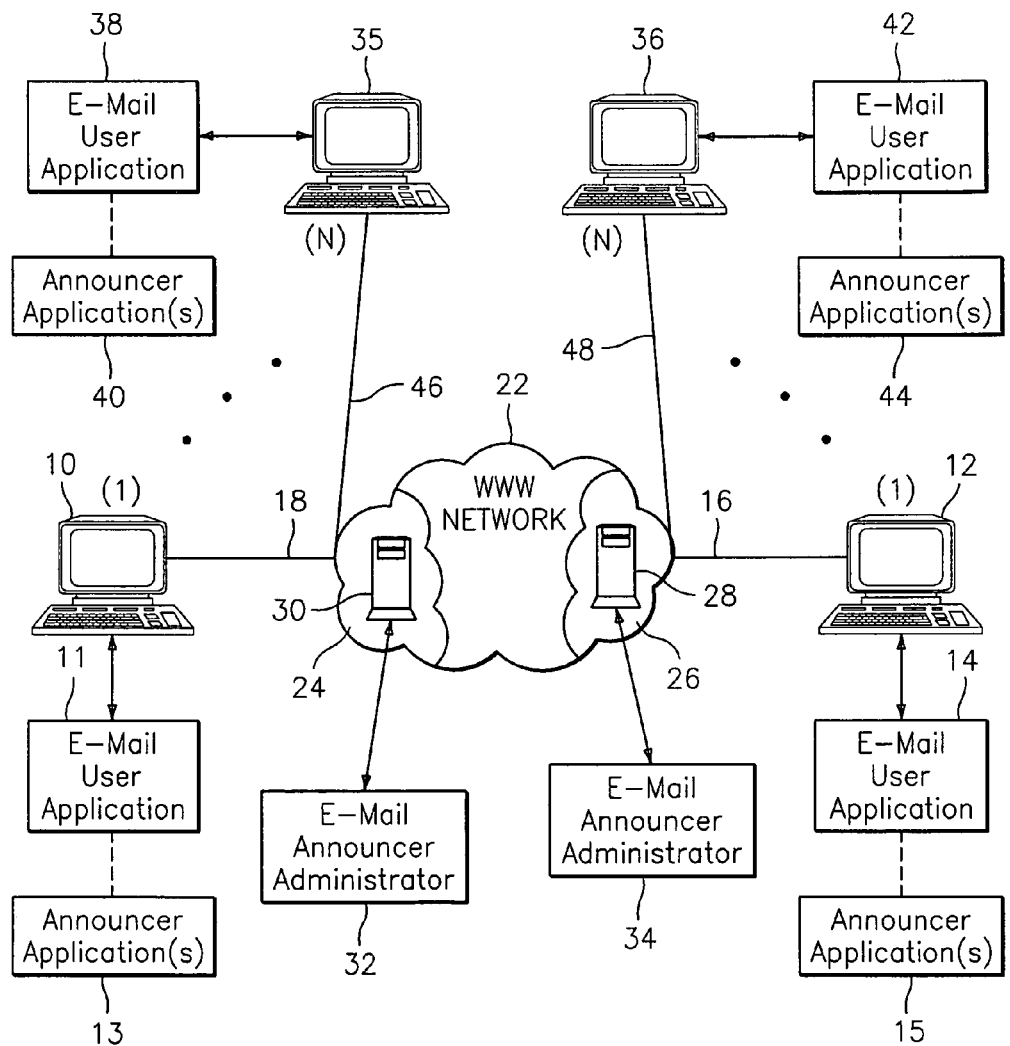
FIG. 2 is a schematic diagram of a second implementation of a computer network system utilizing the world wide web exemplary embodiments.

Regarding FIG. 2, there is shown a computer network system 20 constructed in accordance with the exemplary embodiments. According to an exemplary embodiment, the computer network system 20 utilizes a network, such as the world wide web (internet) 22, for connection to intranets 24 and 26 that each couple to a plurality of computer terminals 1 . . . N. Each computer terminal 10, 35 of the intranet 24 optionally includes an email application program and an announcer application program, programs 11, 13 for terminal 10 and programs 38, 40 for terminal 35, respectively. Similarly, each computer terminal 12, 36 of the intranet 26 optionally includes an email application program and an announcer application program, programs 14, 15 for terminal 12 and programs 42, 44 for terminal 36, respectively. Further, each terminal 10, 35 is coupled for intranet communications by links 18, 46 to a server 30 and the server 30 is coupled for internet communications via WWW 22 to a server 28. Likewise, each terminal 12, 36 is coupled for intranet communications by links 16, 48 to the server 28 and the server 28 is coupled for internet communications via WWW 22 to the server 30. In this manner, each terminal, e.g. terminal 10 can compose and send emails and associated announcement files to any of the terminals on its intranet 24 or any other terminal coupled to the WWW internet 22. Similarly, each terminal, e.g. terminal 12 may receive emails and associated announcement files from any of the terminals on its intranet 26 or any other terminal coupled to the WWW internet 22. Each server 28, 30, in addition to its control and routing functions may optionally include an email announcer administrator programs 32, 34 respectively. As will be more fully explained herein, an email announcer administrator programs 32, 34 allow announcement files associated with sent emails to be identified, controlled and filtered before being routed to other terminals in an intranet or other terminals over the internet. The announcer administrator programs 32, 34 also allow announcement files associated with received emails to be identified, controlled and filtered before being routed.

Figure 3:
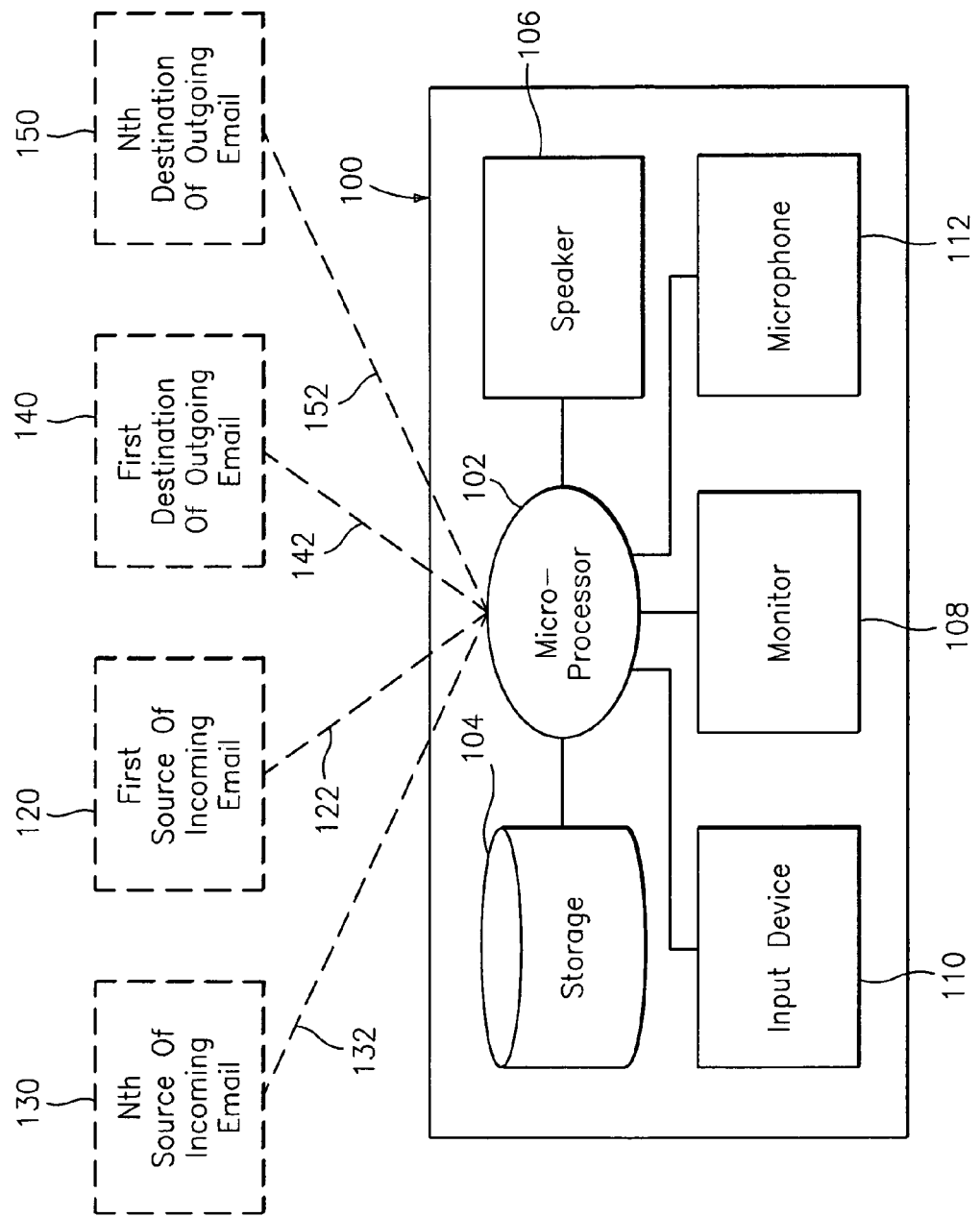
FIG. 3 is an exemplary block diagram of an implementation of one of the computer terminals illustrated in FIGS. 1 and 2.

FIG. 3 shows an exemplary architecture of one or more of the computer terminals illustrated in FIGS. 1 and 2. According to an exemplary embodiment, each computer terminal 100 includes a microprocessor 102, storage or memory device 104, a speaker 106, a display monitor 108, an interface or input device 110 and a microphone 112. As those skilled in the art will appreciate, the terminal 100 can be a personal computer system such as a laptop computer, desktop computer, or the like. According to exemplary embodiments, the terminal 100 may be adapted to run an operating system that can control multiple programs at once, such as Microsoft Windows, or the like, and to run at least one e-mail application program, such as Microsoft Outlook, Lotus Notes, or the like.

As those skilled in the art will appreciate, microprocessor 102 executes programs retrieved from storage device 104 upon commands received from the input device 110. The storage device 104 contains the operating system, email application program 11, announcer application program 13, audio, video, and text files, as well as other application programs and media players necessary to play audio, video, and text files. Storage device 104 can be any device that can store data including a hard drive, tape drive, flash memory, or the like. The audio files can be .wav files or other audio files that can be reproduced on speaker 106 by the microprocessor 102. Similarly, the video files can be .mpeg or other video files that can be reproduced on the display monitor 108 by the microprocessor 102. The text files can be word files or other text files that can be converted to audio files and reproduced on speaker 106 or displayed as text on monitor 108 by the microprocessor 102. Speaker 106, display device 108, input device 110 and microphone 112 are typical elements of personal computer systems and well known in the art. Input device 110 can be one or both of a keyboard and a pointing device. The pointing devices can be, for example, a mouse, a track point, a joy stick, or the like.

The terminal 100 may send email with associated announcement files to a first destination 140 and to any Nth destination 150 via the microprocessor connections 142 and 152 coupled to any of the communications links, for example link 18 in FIGS. 1 and 2. Likewise, the terminal 100 may receive email with associated announcement files from a first source 120 and an Nth source 130 via microprocessor connections 122 and 132 coupled to any of the communications links, for example link 18 in FIGS. 1 and 2.

Figure 4A:
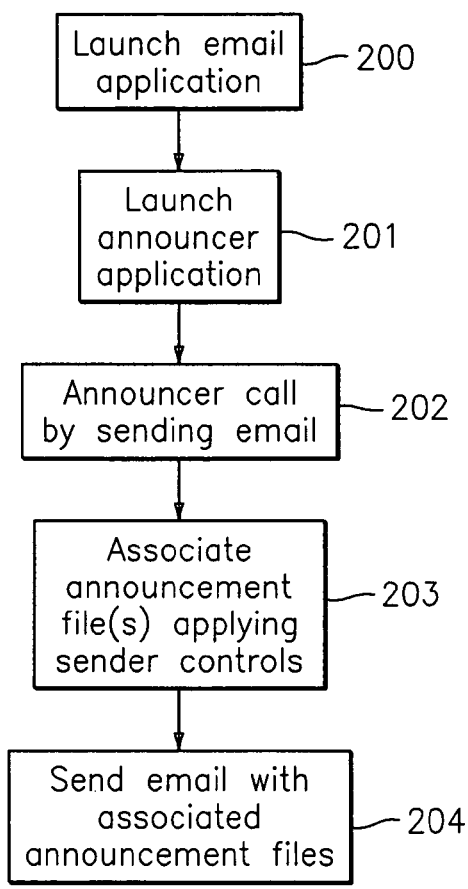
FIG. 4A is a flow diagram of a sender announcer application.

FIG. 4A is a flow chart of execution of the announcer application program 13 at the sender terminal 10. The process begins with terminal 10 launching the email application program 11 for the user in step 200. In this example, the terminal 10 uses Microsoft Outlook as an implementation of the email application program 11. At step 201, the sender announcer application program 13 is launched which enables the user to send email with associated announcement files.

It will be evident to those skilled in the art that there are several ways to launch the announcer application program 13. The announcer application program may be a plug in or complementary program to the email application program 11 that both are running together. Alternatively, if the announcer application program 13 is an integrated component of the email application program 11, the user simply launches the email application program thereby causing the announcer application program 13 to initiate running. Another alternative is that every time the terminal 10 is reset or turned on and the operating system is launched, it will automatically launch the announcement application program 13 or an email application program 11 that contains the announcement application program.

When a user elects to send an email, an announcer call is generated at step 202. As described in further detail herein, the announcer application inspects attributes of an email and associates an announcement file with the email at step 203. Controls are applied by the announcer application to determine which announcement files are to be associated with the email. A step 204, the email and the associated announcement file(s) (if not blocked by certain controls) are sent to the receiver.

Figure 4B:
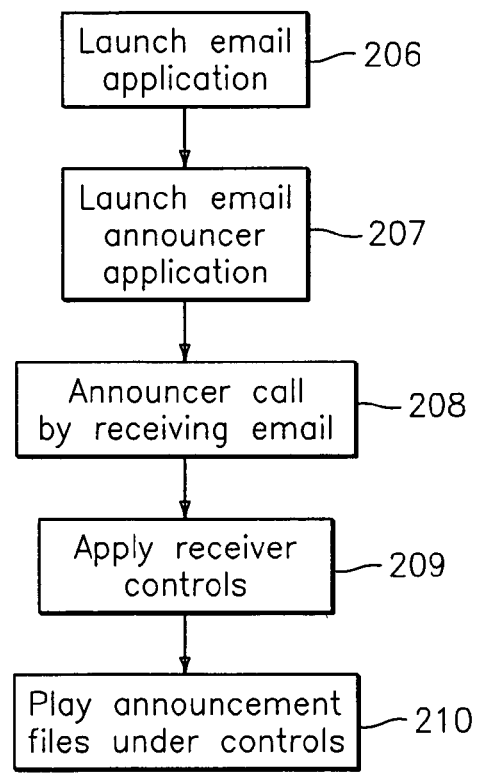
FIG. 4B is a flow diagram of a receiver announcer application.

FIG. 4B is a flow chart of execution of the announcer application program 15 at the receiver terminal 12. The process begins with terminal 12 launching the email application program 14 for the user in step 206. In this example, the terminal 12 will use Microsoft Outlook as an implementation of the email application program 14. At step 207, the receiver announcer application program 15 is launched which enables the user to receive email with associated announcement files.

It will be evident to those skilled in the art that there are several ways to launch the announcer application program 15. The announcer application program may be a plug in or complementary program to the email application program 14 that both are running together. Alternatively, if the announcer application program 15 is an integrated component of the email application program 14, the user simply launches the email application program thereby causing the announcer application program 15 to initiate running. Another alternative is that every time the terminal 12 is reset or turned on and the operating system is launched, it will automatically launch the announcement application program 15 or an email application program 14 that contains the announcement application program.

When an email is received at receiver terminal 12, the announcer application is called at step 208. The announcer application inspects attributes of the received email and announcement files (if any). A step 209, the announcer application applies controls to determine whether the announcement file associated by the sender should be played, or an alternate announcement file played. The controls applied at the receiver terminal are described in further detail herein. At step 210, announcement files are played indicating to the recipient that an email has arrived. The announcement files may include text, audio, video, pictures, and combinations thereof. The term "play" as used herein refers to presenting the contents of the announcement file in a human recognizable form (e.g., displaying text or pictures, generating audible tones).

Figure 5:
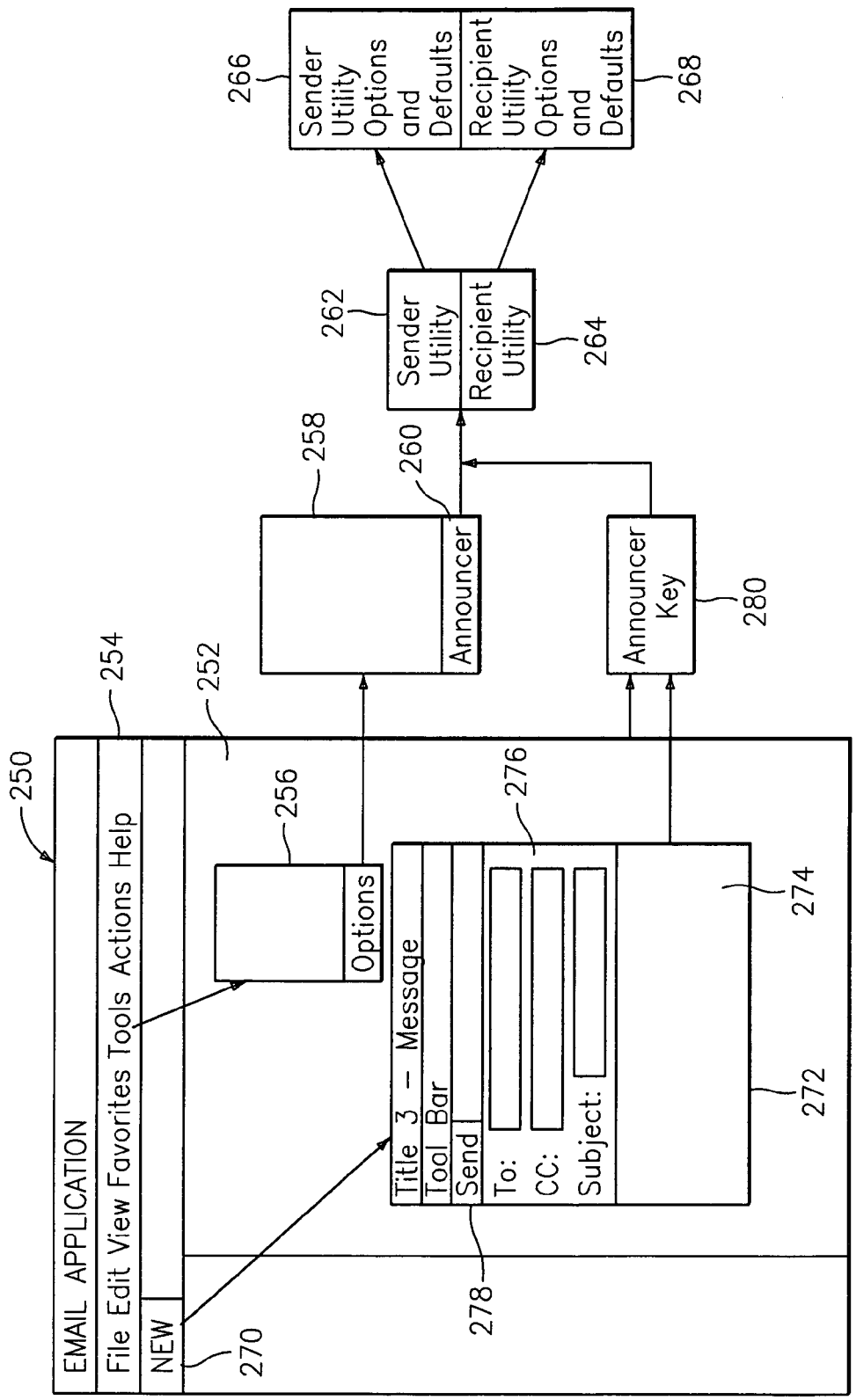
FIG. 5 is a pictorial representation of the interactive interfaces for the email application program, the sender announcer application program and recipient announcer program of the terminal illustrated in FIGS. 1 and 2.

While the email application program 11 and the announcer application program 13 are concurrently running, it is desirable to be able to communicate between the two to facilitate the use of the announcer function of the system. FIG. 5 shows one example of integrating the announcer function into the email application program 11 with a plurality of interactive graphic interface screens that allow the user to control both programs seamlessly. User interface 250 is a typical main screen for an email application program 11 where emails waiting to be opened are listed in a window 252. The window 252 also contains a tool bar 254 from which control selections, defaults and user preferences may be performed. One user option is the tools submenu 256 which the user selects by clicking on the term tools with the input device 110 in the tool bar 254.

Another submenu of applications for the tools menu 256 is the options submenu 258 to which a selection for the announcer function 260 has been attached. Selection of the announcer function 260 by the user renders the choice of either the sender announcer utility 262 or the recipient announcer utility 264. Selection of the sender utility choice 262 sends the user to another interactive menu of the sender utility 266 where the options and default selections of the sender announcer application program can be made. The alternative choice 264 of the recipient utility sends the user to the interactive menu of the recipient utility 268 where the options and default selections of the recipient announcer application program can be made. These interactive graphics menus allow the user to start his email application program 11 and then set the options and defaults for the email announcer application 13 advantageously before calling other programs to run on top of his desktop.

According to an exemplary embodiment, if the user wishes to compose an email with email application program 11, he will select the new button 270 on the menu bar and a message composition screen 272 will appear to assist. Once the user has filled in the body of the email in screen 272 and addressed it in screen 276, he will select the send button 278 and cause the email to be sent. Prior to sending the email, if the user wishes to associate an announcement with an outgoing email, to check on a former association, or modify, alter or delete a former associated announcement file, he will use a preselected announcer key combination 280, referred to herein as a hot key, on his input device 110 to transfer control to the announcer utility functions 266, 288. In the example, this will allow him to select the sender utility 266 and select, change or modify the announcement file associations. Optionally, the user may also enter the announcer utilities 266, 268 through the announcer key 280 from the screen 250.

Figure 6:
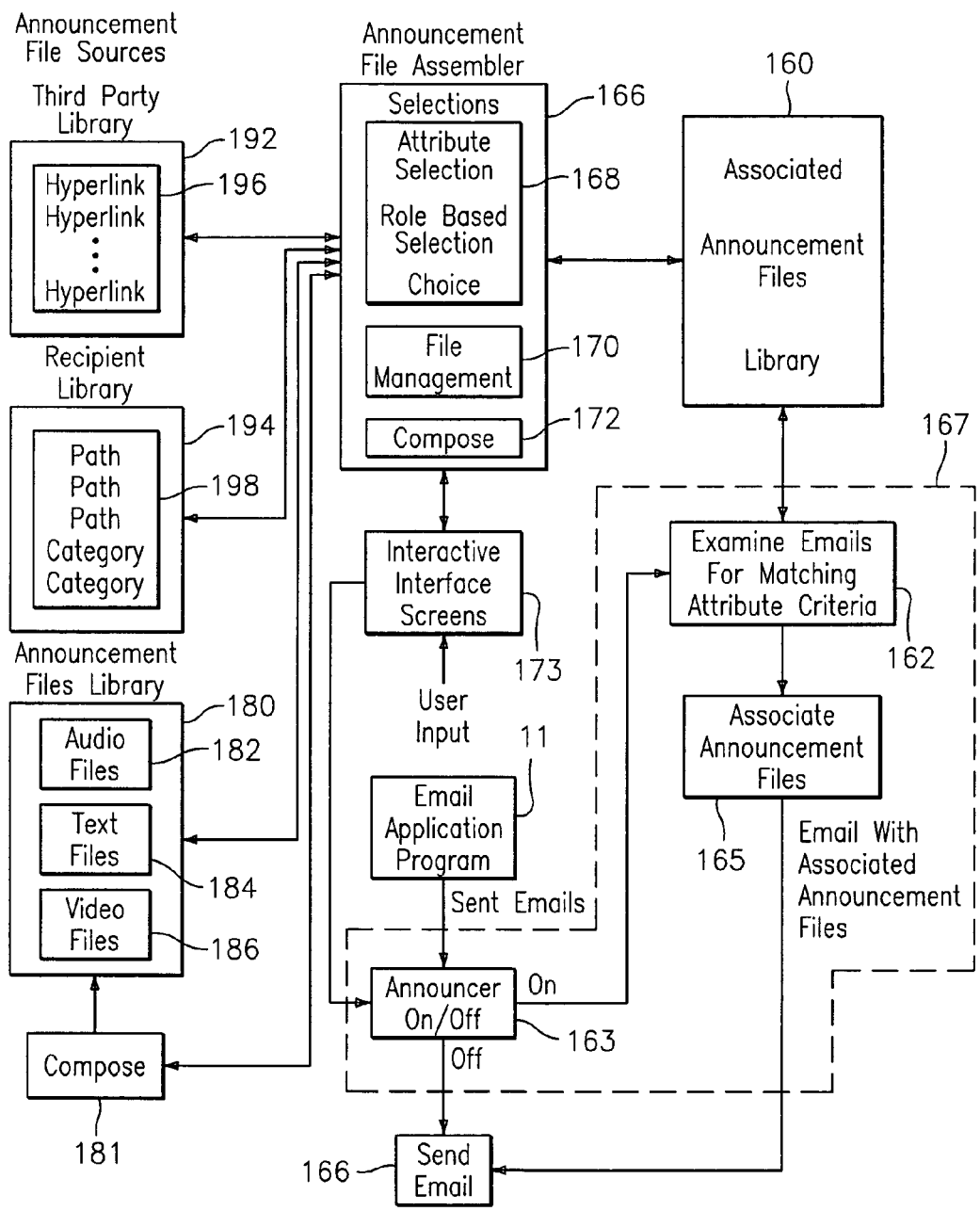
FIG. 6 is a functional block diagram of the sender announcer application program called in the flow diagram of FIG. 4.

With respect now to FIG. 6, a functional block diagram of embodiments of a sender announcer application program will be more fully described. The purpose of the sender announcer application program is to provide a flexible and advantageous process for associating one or more announcement files with one or more attributes of one or more emails. The association allows the announcement file when played by a recipient to announce the attribute to the recipient without having to read the entire email at the particular time and without bringing the email application to the upper window of the desktop while using a Windows type operating system. To implement this purpose, the sender application program assembles an associated announcement file library 160 that includes a matrix of associations. The associations are generally made according to a defining attribute, such as a sender address, message urgency, subject line contents, and a definition for desired matching criteria, for example, a message labeled with a "high" urgency, to as a "specific" sender address for a "specific" subject. To complete the association, an announcement file, such as an audio file of a siren, is associated therewith by the sender.

The announcement files may be obtained or purchased by individual senders of email. For example, a sender may be a fan of the television program The Simpsons, and download a set of audio and/or video files to be added to the associated announcement file library 160. These announcement files may be downloaded from a website offering the announcement files. The announcement files may be purchased (if the value is significant enough to the users) or may be freely distributed. Free distribution of announcement files may be used to promote goods or services. For example, Warner Brothers may wish to promote the latest Harry Potter movie by freely distributing email announcement files having themes consistent with the movie.

With the associated announcement files library 160 assembled, a user composes emails in a with the email application program 11 and when finished selects the send button when the email is completed. An email association function 167 detects the send selection of the email application program 11 and determines whether the user has turned the announcer function on in announcer control routine 163. The announcer control routine 163 permits the user to turn the announcer function on or off, thereby giving him the flexibility to either associate an announcer file with the outgoing email or not. Further, the user may turn the announcer control on for only one email or leave it on for all emails that he wants to be announced. If the announcer function is turned off in the announcer control routine 163, then the email will return to the normal send email routine 166 of the email application program 11 and be communicated over the network 17. If the announcer control routine 163 has the announcer function turned on, then the email is examined as to its attributes that are stored in the announcements files library 160 by matching routine 162. Each listed attribute in the library 160 is tested to determine if there is a matching criterion in the email. If there are one or more matching attribute criteria, then the association function 167 associates the announcement file(s) linked to those attributes and matching criteria in association routine 165. After the association of the announcement files with a particular email, the email will return to the normal send email routine 166 of the email application program 11 and be communicated over the network 17.

Figure 7:
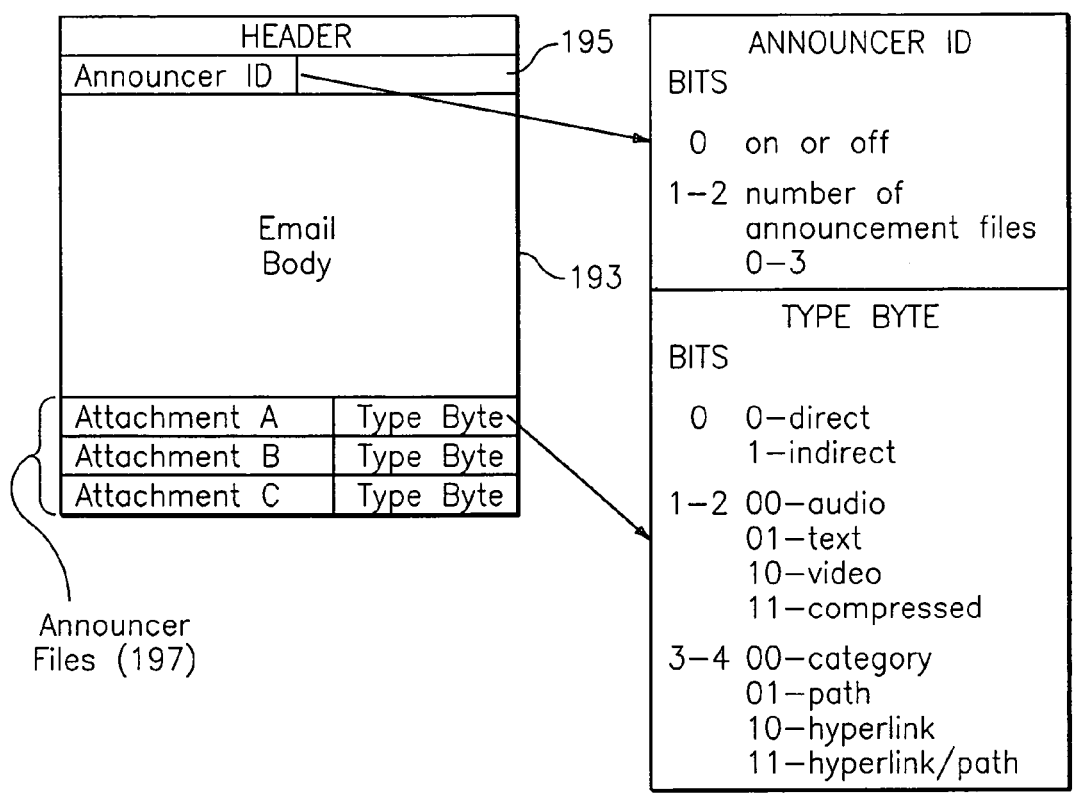
FIG. 7 is a pictorial representation of an email with associated announcement files.

With reference to FIG. 7, to associate the announcement files with an email, the association routine 165 in embodiments writes an announcer ID in the header 195 of an email 193. The announcer ID is a multi-bit identifier that tells the email recipient application program 13 whether or not an announcement file has been associated with the email 193 or not. A set bit in the first position of the identifier, bit 0, is used to indicate that announcement files are associated with the email and a cleared bit in bit 0 to indicate there are no announcement files associated with the email. Next in the announcer identifier, two bits indicate the number of announcement files associated with the email 193 from 1-4. The email body follows the header 195 that contains, in addition to the announcer ID, all of the normal header information, such as sender, recipient, source address, destination address, subject line, etc. The associated announcement files 197 in embodiments are associated as attachments in a conventional manner. Each announcement file 197 begins with a byte of information indicating in the first bit, bit 0, whether the following file is the actual announcement file (direct) or an address or path to an announcement file (indirect). The next two bits, bits 1-2, indicate the types of file to be announced (whether direct or indirect) and include audio, text or video files and an indication whether such files are compressed. The next two bits, bits 3-4, indicate the types of indirect paths to the announcement file(s) 197 and include a category path, local path, hyperlink, or hyperlink with path.

Returning now to FIG. 6, embodiments of the sender announcer application program also provide an announcement file assembler 166 that under the commands of the user from interactive interface screens 173 builds the associated announcement files for the library 160 from several sources. The announcement file assembler 166 builds the associated announcement files library 160 from sources including an announcement files library 180 stored on the sender terminal, announcement files 194 stored on the terminal of the recipient, and announcement files 194 stored on the computer terminal of a third party.

The announcement files library 180 stored on the terminal of the sender can comprise audio files 182, text files 184 and video files 186. Other sources of announcement files are not sent to the recipient as actual announcement files but are instead associated as their address (indirect). If the announcements files 198 are located on the terminal of the recipient, then either a path, such as c:/program files/announcement/wave/siren.wav, is sent to allow the recipient terminal to find the announcement file or a category indicator such as happy, sad, emergency, impatience, etc. is sent with the knowledge that the recipient has associated their own choice of announcement file with that category indicator. For third party announcement files, the web address (hyperlink) of the announcement file that the sender wishes to associate is sent as the announcement file. The hyperlink may also direct the recipient to a codec needed to play an announcement file. The web address of a third party announcement file may be sent either alone or in combination with a path link.

The announcement file assembler 166 comprises several optional processes that a user may choose from to assemble an announcement file association for the library 160 from the announcement file library 180 of the sender or the other sources of announcement files 192 and 194. As one option, a selection of primary attributes is provided in selections routine 168 where important attributes such as the urgency of the email, the sender address, the recipient address, the emotional category, the email length, etc. can be selected by an interactive interface and one or more announcement files associated with that attribute through that interfaced. As a second association option in selections routine 168, the announcement file association can be made according to a rule set selection that the user may establish. The third option in selections routine 168 is a pure choice selection, an association process that allows spontaneous associations at the time of composing the email from any announcement file from any source.

Another option provided by the announcement file assembler 166 is a file management process 170 that permits the announcement files in the associated announcement files library 160 to be changed, for example by adding to the association, deleting information from the association or modifying the association in some other way. Similarly, the file management process 170 permits the announcement files 182, 184, 186, 196 and 198 in the libraries 180, 192 and 194 to be changed, for example by adding files or addresses, deleting files or addresses, or modifying the files or addresses in some other way.

In addition, the announcement file assembler 166 optionally includes a compose selection 172 for the user. The choice by the user of the compose selection 172, which calls a compose function routine 181, allows the user a process to compose his own announcement files for the library 180. He may compose either an audio file to add to announcement file 182, a text file to add to announcement files 184, or a video file to add to announcement files 186.

Figure 8:
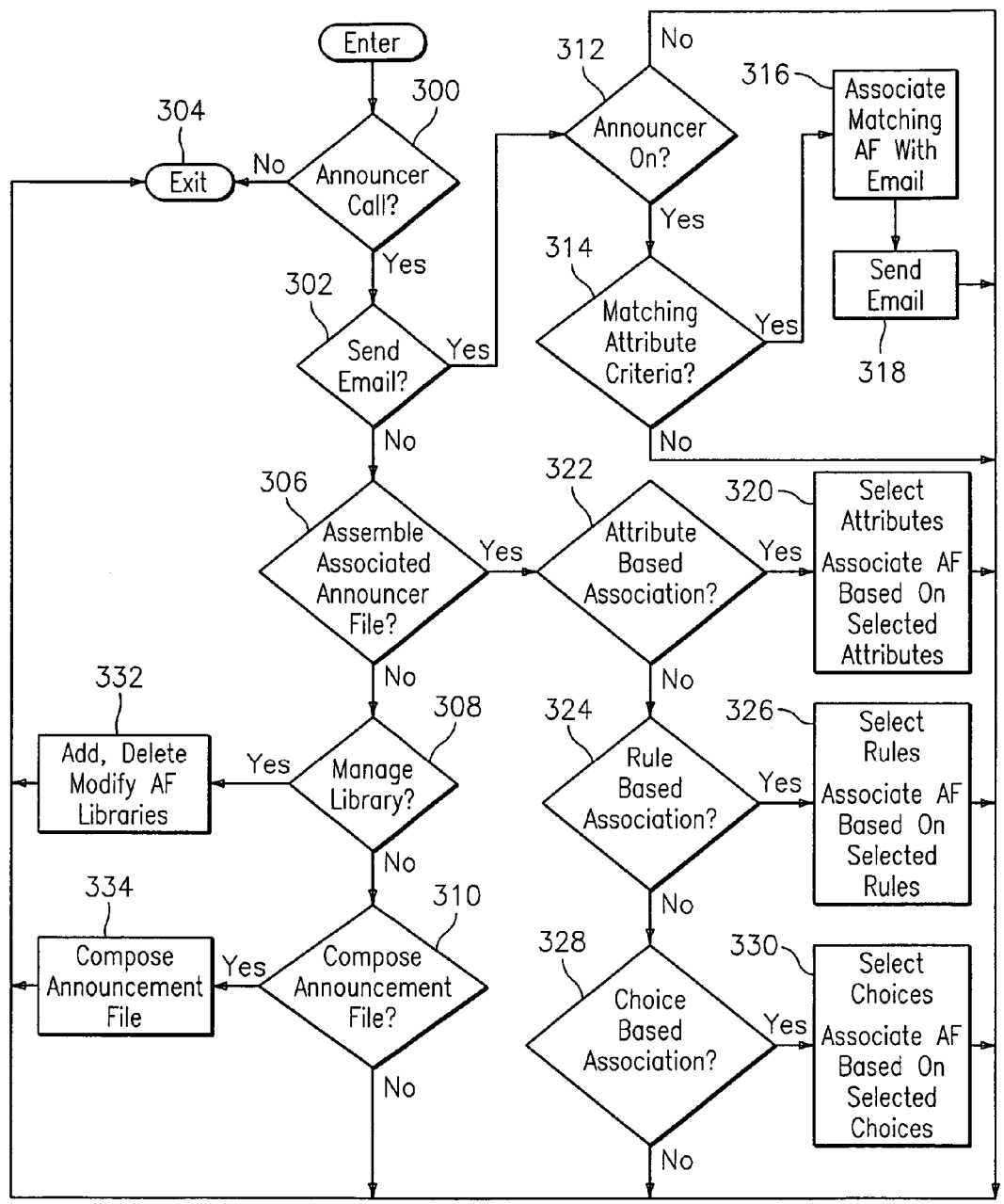
FIG. 8 is a flow diagram of the sender announcer application program of the block diagram in FIG. 6.

A flow chart for the sender announcer application program will now be discussed with reference to FIG. 8. The sender announcer application program is entered in step 300 when an announcer call has been detected, either by the user calling the sender utility by the methods described in FIG. 5 and choosing an option for the announce file assembler 166 or by the user hitting the send button 278 in FIG. 5 to send an email, by the program step 206 in FIG. 4. In response to the transfer to step 300, the program checks to determine whether a valid announcer call has been made. If an announcer call has been made the program determines the source of the call in steps 302-310. Step 302 determines whether the announcer call was on account of the user wanting to send an email, while steps 306-310 determine whether there is a user selection of an option for announcement file assembler 166.

If the command is to send an email, then in step 312 the program determines whether the user has turned the announcer function on. If the announcer function is turned on, then in step 314 the association function routine 167 determines whether there is matching attribute criteria between the present email and those associated in the library 160. Those announcement files having matching criteria are then associated with the email in step 316 in the format described in FIG. 7 and the email is sent in step 318 by the email application program 11. Otherwise the program exits in step 304 for determinations that the announcer function is not on or that there are no matching attribute criteria between the email being sent and those stored in the library 160.

If the command is a selection for announcement file assembler 166, then in steps 306, 308 and 310 the program determines whether the user has elected the assemble associated announcer file function in step 306, the manage library function in step 308 or the compose function in step 310. If the decision in step 306 is affirmative, then the program tests which file assembly choice has been made in steps 322, 324, and 328. If the choice has been made to assemble an associated announcer file based on attributes in step 322, then in step 320 an interactive interface screen is displayed to assist the user in making his attribute and association selections. If the choice has been made to assemble an associated announcer file based on rules in step 324, then in step 326 an interactive interface screen is displayed to assist the user in making his rule and association selections. If the choice has been made to assemble an associated announcer file based on choice in step 328, then in step 330 an interactive interface screen is displayed to assist the user in making his choice and association selections. If the choice has been made to manage the library in step 308, then in step 322 an interactive screen is displayed to assist in the file management. If the choice has been made to compose an announcement file in step 310, then in step 334 the compose function 181 is called and interactive screen is displayed to assist in the composition of an announcement file.

Figure 9:
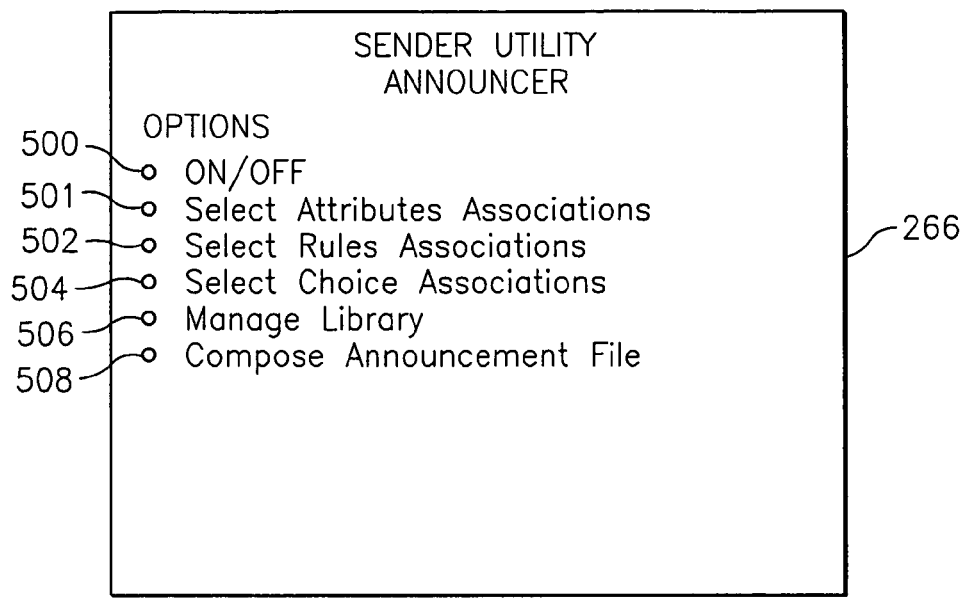
FIG. 9 is a pictorial representation of the interactive screen control for the sender announcer application program illustrated in FIG. 8.

FIG. 9 is a representative pictorial of the interactive screen 266 that is displayed when the utility program for the sender announcer application program is called in FIG. 5. This screen allows the user to command the sender announcer program to display the selection screens for associating announcement files and provides defaults and other optional functions. The screen 266 provides a series of selection buttons 500-508 that can be selected by clicking on them with the cursor 110 of the terminal 100. The status of each button is then stored in the memory of the terminal 100 where the sender announcer application program can read that status and respond accordingly.

When the screen 266 is displayed, the user can turn the sender announcer function on or off by selecting the state of the button 500. When the button 500 is in the off state, the associated announcement files of library 160 are not associated with outgoing emails. When the button 500 is in the on state, the association function matches attribute criteria and associates the announcement files with the outgoing emails. If the user decides to associate announcement files with emails, then he will select one of the select buttons 501, 502, or 504 for the manner of association. Selecting button 501 for attribute associations will issue an announcer call and start the sender announcer application program where step 320 of FIG. 8 will be entered to implement the function. Selecting button 502 for rule associations will issue an announcer call and start the sender announcer application program where step 326 of FIG. 8 will be entered to implement the function. Selecting button 504 for choice associations will issue an announcer call and the start sender announcer application program where step 330 of FIG. 8 will be entered to implement the function. Similarly, selecting button 504 to manage the libraries will issue an announcer call and start sender announcer application program where step 332 of FIG. 8 will be entered to implement the function. Selecting button 504 to compose announcement files will issue an announcer call and start sender announcer application program where step 334 of FIG. 8 will be entered to implement the function.

The sender announcer application program in embodiments of process step 320 provide the user with a convenient process and tool for selecting attributes of an email to associate with corresponding announcer files. As better illustrated in FIG. 11, an interactive interface association screen 600 is displayed to the user (sender) when the program transfers from step 320 in FIG. 8. In the association screen display 600, the terminal 100 graphically displays a list of selected attributes of an email in display boxes 610-650. The interactive display allows the user to navigate through the screen and make choices therein by way of his cursor or keyboard 110 with the terminal 100. This selection process allows a user to select the announcer files that he wishes to associate with a particular attribute of the email he is sending or one that he will send in the future. The interactive screen 600 also allows him to choose for association among a plurality of audio, video and text files whose names are displayed in display boxes 660, 670, and 680, respectively. These names are the identities of the announcement files 182, 184, and 186 stored in the announcement files library 180.

In operation, the user enters the interface display screen via step 320 and then determines whether he would like to create a new association or replace a current association by selecting (left click) button 690 or button 692 with his cursor. If the button 690 is selected to create a new association, then the user may check any of the six attributes in display boxes 610-650, which represent the attributes of the email as to urgency display routine 610, identity display routine 620, address domain display routine 630, subject line content display routine 640, category display routine 645 or message size display routine 650, respectively. It will be evident that these are only examples of attributes and many other attributes could be listed.

If the user has checked the message urgency attribute display box 610, then he may also select one or all of the subcategories of urgent/high, normal/medium, or low by clicking on the selection bullets 612, 614, or 616. The user, depending upon the selection of the urgency attribute and the subcategory, may then associate one or more announcement files whose names are displayed in display box 660 for audio files, display box 670 for video files, and display box 680 for text files, with the selected attributes. An announcement file is associated with the particular attribute by highlighting the appropriate announcement file box 646 corresponding to the attribute and then by selecting (right click) from the desired display boxes 660, 670 and 680 an announcement file name. Each announcement file box 646 will then display the file name of one or more selected announcement files as associated with that email attribute. More than one announcement file may be selected for each attribute and more than one type of announcement file, audio, text or video may be selected for each attribute.

In a similar manner, the attributes of a recipient identity or a sender identity may be selected in display box 620. Display box 630 allows a user to select a subset of the identity selection by providing for a selection of a part of an identity address, which is the sender address domain or the recipient address domain. The display box 640 allows a user to select as the email attribute the contents of the subject line of the email. For each of the choices of attribute in display boxes 620, 630 and 640, there is also the selection of whether the attribute selected has to be the exact wording of the email or to only contain the selected attribute partially. Display box 645 allows the user to select the attribute of a category of email, based on an emotional criteria such as a happy one, a sad one, etc. or some other category such as from the senders company or from his supervisor. The user, after selection of the attributes in display boxes 620, 630, or 640, will proceed to identify the chosen identity, domain, or subject line by typing into the display boxes 622, 632, or 642 the information that will become that attribute criteria. The announcer files are associated as before by highlighting the display box 646 to which the file corresponds and then by selecting an announcement file from one or more of the file display boxes 660, 670, and 680. After the creation of a new association, the user selects the create new association button 690 and exits back to the sender announcer application program.

With respect to the recipient identity criteria, the sender of the email may associate one or more announcement files with a recipient in the sender's address book provided by the email application. For example, the sender's address book may include a field for each entry for designating an announcement file(s) for a recipient. Further, a sender's address book may include recipient groups, with announcement file(s) associated with the group. If an email is sent to a group, the group associated announcement file takes precedence over any individual announcement files associate with individual recipients in that group. It is understood that the sender announcer application and recipient announcer application may operate without reference to an address book and may associate announcement files with electronic messages based on a number of attributes as described herein.

Figure 11:
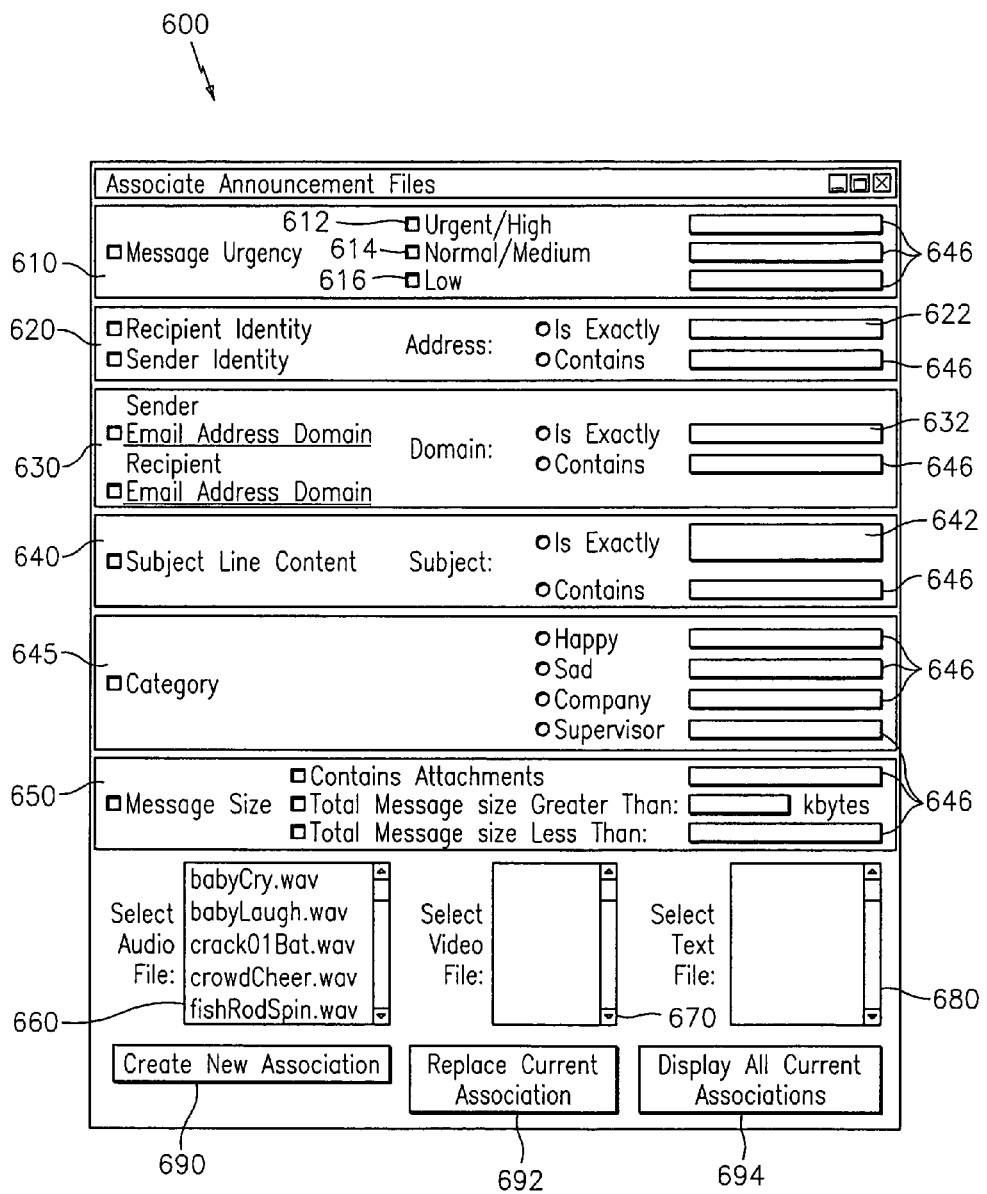
FIG. 11 is a graphical representation of an interactive screen display for associating announcement files and attributes of an electronic message that is called from the sender announcer application program illustrated in FIG. 8.

As an alternative, upon the interface association screen of FIG. 11 being displayed, if the user wants to replace a current attribute association, he will then select button 692. The mode of operation will allow the user to select the particular attribute for which he desires to know the present association in display boxes 610-650 by selecting or deselecting each attribute choice box. After the user has finished his selections, the interface association screen in FIG. 11 will display the corresponding announcer files previously associated with his present attribute selections. The deselected attributes will be blanked. The user may then change the associated announcement file for selected attributes by highlighting the particular announcement file that is to be changed or deleted and by either right clicking (delete) on the presently associated announcer file or selecting an announcer file (replace) from display boxes 660, 670 and 680. After the modification of a current association, the user may click again on the button 692 and exit back to the sender announcer application program.

Figure 12:
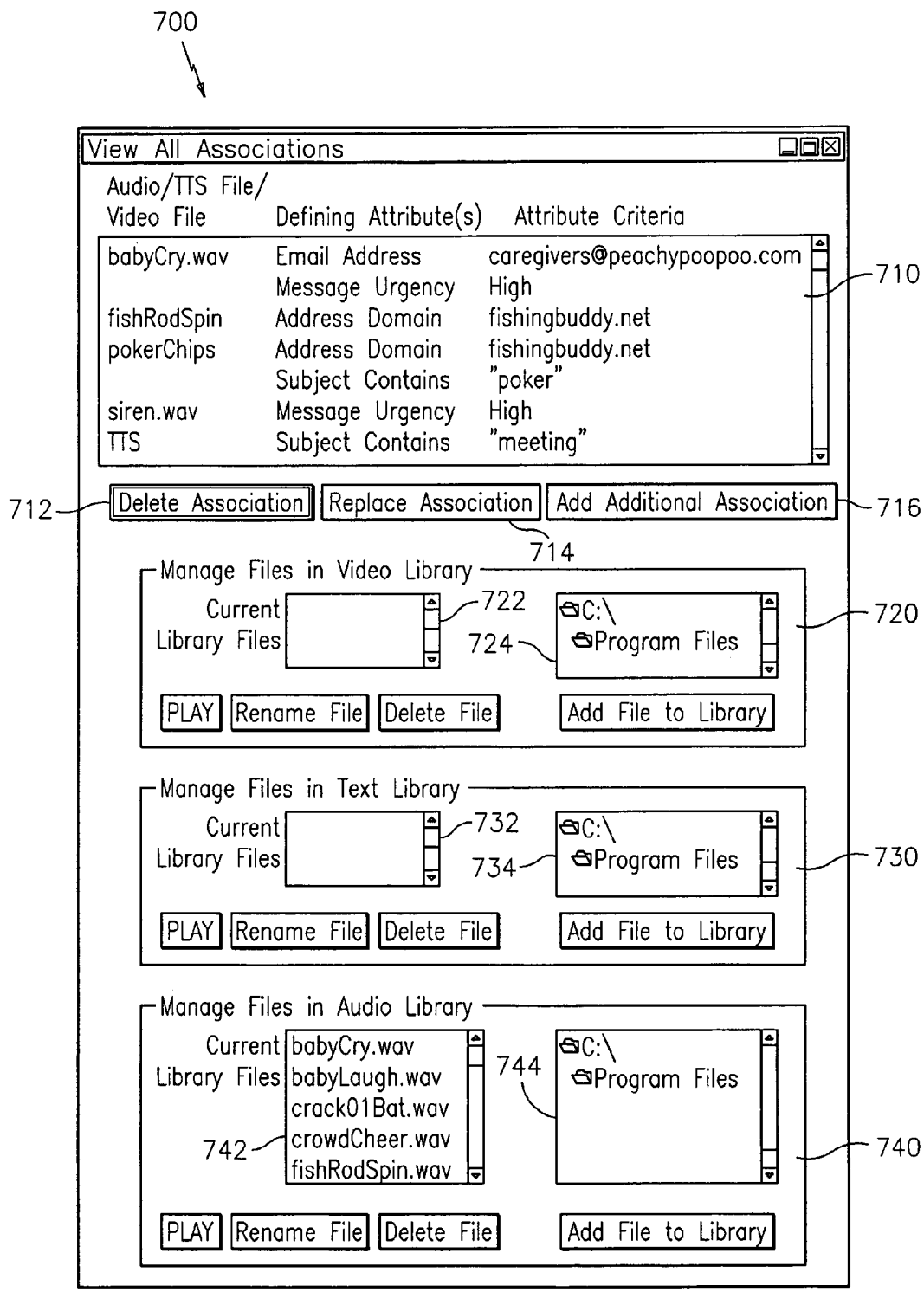
FIG. 12 is a graphical representation of an interactive screen display for viewing and changing announcement file associations of an electronic message that is called from the sender announcer application program illustrated in FIG. 8.

If the user would like to review all of the associations that he has made, then during the interface association screen in FIG. 11, he will select the button 694 to display all of the current announcer file associations stored in the associated announcement files library 160 for this user. Selection of the button 692 will cause an exit from the display screen in FIG. 11 and will cause the program to display the interactive interface display screen 700 in FIG. 12. The display screen in FIG. 12 provides a display of all the presently active associations that the user has made and stored in the library 160 in a scrollable display window 710. The display window is organized as to which announcement files are associated with which defining attributes and what the criteria of those attributes are.

The user may also manage the files in the associated announcement files library 160. By selecting from buttons 712, 714 and 716 the user can delete an association, replace an association, or add an additional association, respectively. The user deletes an association by highlighting that associated announcement in the display window 710 and then by selecting the delete association button 712. The user may also replace an association by highlighting it in the display window 710, selecting its replacement in the display windows 722, 732 or 742 and then by clicking the replace association button 714. A user may also add an association by highlighting a defining attribute in the display window 710, selecting an additional announcer file from display windows 722, 732, or 742 and then by clicking on the add additional association button 716.

The interface display screen 700 also provides the user with process for management of the files in library 180. In the interactive display screen 700, a display window 722 for the names of the video announcement files 186, a display window 732 for the names of the text announcement files 184, and a display window 742 for the names of the audio announcer files is provided. The user may view the current announcement files stored in the announcement files library 180 by these windows and manage the library with a several control functions. Optionally, the display screen 700 also provides this announcement file management process where announcement files may be renamed, deleted or added to the library 180. Highlighting a particular announcer file in a display window 722, 732, or 742 and then selecting the delete file button will delete that announcement file. Similarly, an announcement file is renamed by highlighting it in one of the display windows 722, 732 or 742 and then by selecting the rename file button. This will allow a type over of the highlighted file by the user from the keyboard 110 to rename the file. The display screen 700 also provides the scrollable display windows 720, 730 and 740 that allow the user to select any file stored on his terminal 100 in the memory 104, which may be either local or peripheral. Once that file is selected by highlighting, it may be added to the particular library file by selecting the corresponding add file to library button. An announcement file in display windows 722, 732 or 742 may be previewed by highlighting the announcement file and selecting a Play button. This allows a sender to preview the announcement file prior to associating the announcement file with a communication. Announcement files may be added in the normal manner to local or peripheral file folders by downloading them, imported from programs loaded on the drive, or the like.

Figure 13:
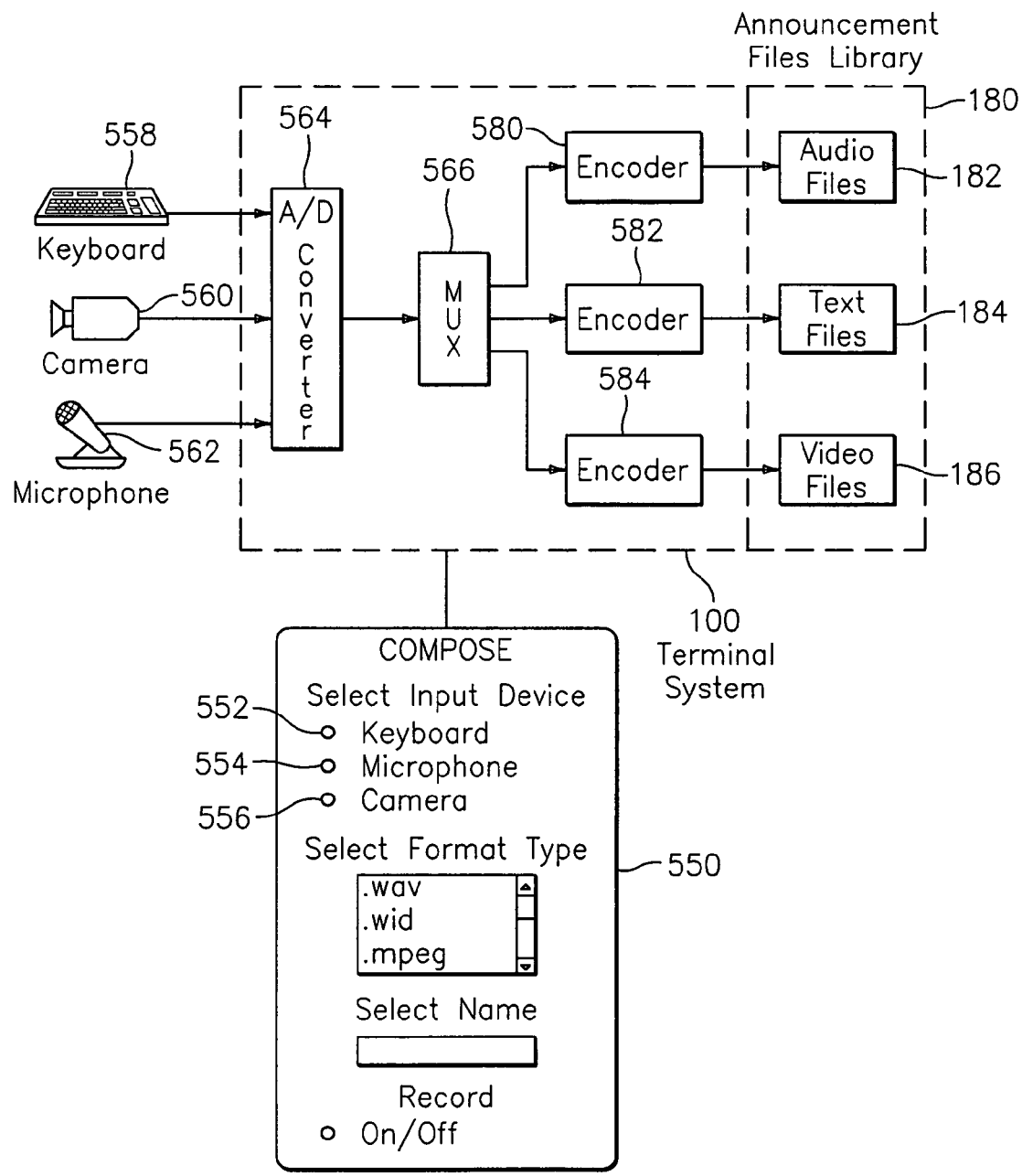
FIG. 13 is a functional block diagram of a feature allowing the user to compose an announcement file for the announcement file library.

Referring to FIG. 13, the compose function of the sender announcer application program is shown in greater detail. The compose function allows the user to make his own audio, video or text file for the announcements files library 180. The compose function is entered by the user selecting the compose button on the sender announcement utility screen. The selection of the compose button from FIG. 8 will cause an interactive screen 550 to be displayed on monitor of the terminal 100.

The interactive screen 550 allows the user to select an input device for composing the announcement file by selecting one of the buttons 552-556. A keyboard 558 can be selected by button 552, a camera 560 can be selected by button 554, or a microphone 512 selected by a button 556. The interactive screen 550 also allows for the choice of the output format of the announcement file from the group of text file/type, video file/type or audio file/type, for example text.wrd, video.mpeg, or audio.wav. The selection of the name of the announcement file may be implemented by typing into the input routine 559 and selecting button 557.

The name selection, type of file, format and input device will be used by the compose function to from connections for the chosen input device to the destination of the announcement file in the announcements file library 180. The paths are chosen through an analog to digital converter 564 that converts the analog signal from the camera 560 and the microphone 562 into digital format. The digital input from these two devices and that of keyboard 558 is routed by multiplexer 566 to one of the three memory spaces for audio files 182, text files 184 or video files 186 through encoders 580, 582 and 584, respectively.

For example, if the input device is the keyboard 558 and the format chosen is audio.wav, then the input from the keyboard is directed through the multiplexer 566 and encoder 580 to be stored in audio files 182. The encoder 580 converts the keyed output to .wav format under the file name chosen. If the input device is the keyboard 558 and the format chosen is text.wrd, then the input from the keyboard is directed through the multiplexer 566 and encoder 582 to be stored in text files 184. The encoder 582 converts the keyed output to .wrd format under the file name chosen. If the input device is the microphone 512 and the format chosen is audio.wav, then the input from the microphone is directed through the A/D converter 564, the multiplexer 566 and encoder 580 to be stored in audio files 182. The encoder 580 converts the multiplexer output to a .wav format under the file name chosen. If the input device is the microphone 512 and the format chosen is text.wrd, then the input from the microphone is directed through the A/D converter 564, multiplexer 566 and encoder 582 to be stored in the text files 184. The encoder 582 converts the keyed output to a .wrd format under the file name chosen. If the input device is the camera 560 and the format chosen is video.mpeg, then the input from the camera is directed through the A/D converter 564, multiplexer 566 and encoder 584 to be stored in video files 186. The encoder 584 converts the camera output to an .mpeg format under the file name chosen.

Figure 14:
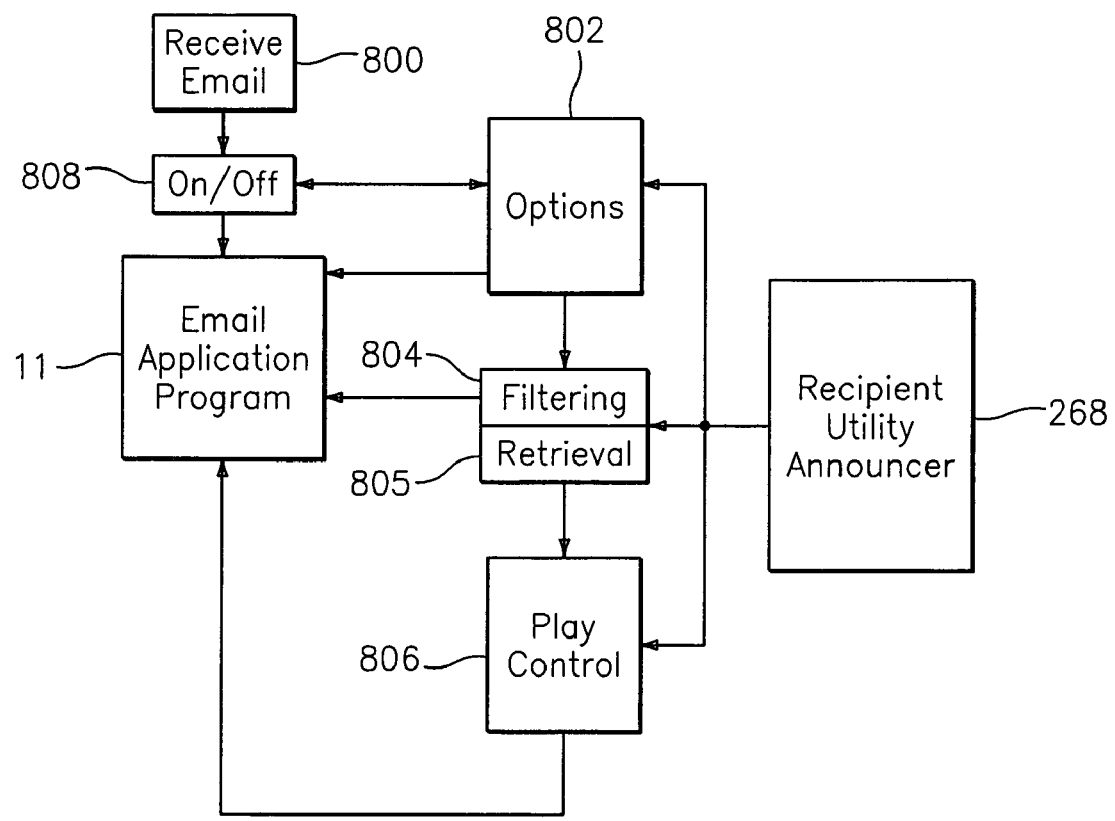
FIG. 14 is a functional block diagram of the recipient announcer application program called in the flow diagram of FIG. 4.

The recipient announcer application program allows a recipient to receive emails with associated announcement files and to play the announcement files in a controlled manner. FIG. 14 illustrates a functional block diagram of the interaction between the email application program 11 and the recipient announcer application program. The email application program 11 contains a portion 800 that detects a received email at the terminal 100 of a recipient. When a received email is detected, it is diverted for processing to the recipient announcer application program that includes an options section 802, a filtering and retrieval section 804 and a play control section 806. The control of these sections of the program is provided by the interactive screen 268 called in FIG. 5 as the recipient utility. The options section 802 allows the recipient to turn the recipient announcer function on or off for particular periods of time based upon conditions that are chosen by him. For example, if he is at work and leaves the office for a meeting, a recipient may turn off the announcer function. Also, the announcer function may be turned off during non-work hours and on during work hours automatically.

If the recipient announcer function is off, then function control routine 808 will pass all incoming emails to the email application program 11 without further processing where it is handled conventionally. If the recipient announcer function is on, then the email is subject to a series of selectable filters 804 that will determine whether the email is an announcement email by having an announcer ID and associated announcement files to be played, and will eliminate certain other emails from playing their announcement files based upon characteristics of the email. Those emails not selected for playing their announcement files, or those that do not contain announcement files are returned to the email application program 11 without further processing where they are handled conventionally. After filtering for non-playable emails, the program in retrieval section 805 retrieves those announcement files the recipient has chosen to have played from a number of sources. For emails having an associated announcement file, the standard new email notification is suppressed. The sources may be diverse and include those attached or associated to the email, or from paths or websites attached or associated with the email.

A play control section 806 then handles the play of the announcement files retrieved. A primary function of the play control 806 is to call the corresponding media players necessary to play the announcement files of an email and then to play them. The play control also functions in combination with the interactive screen 268 to provide utilities for limiting the play time of each announcement file and filtering the announcement file for content. After the announcement files have been played, the emails are returned to the email application program 11 without further processing where they are handled conventionally.

Figure 15A:
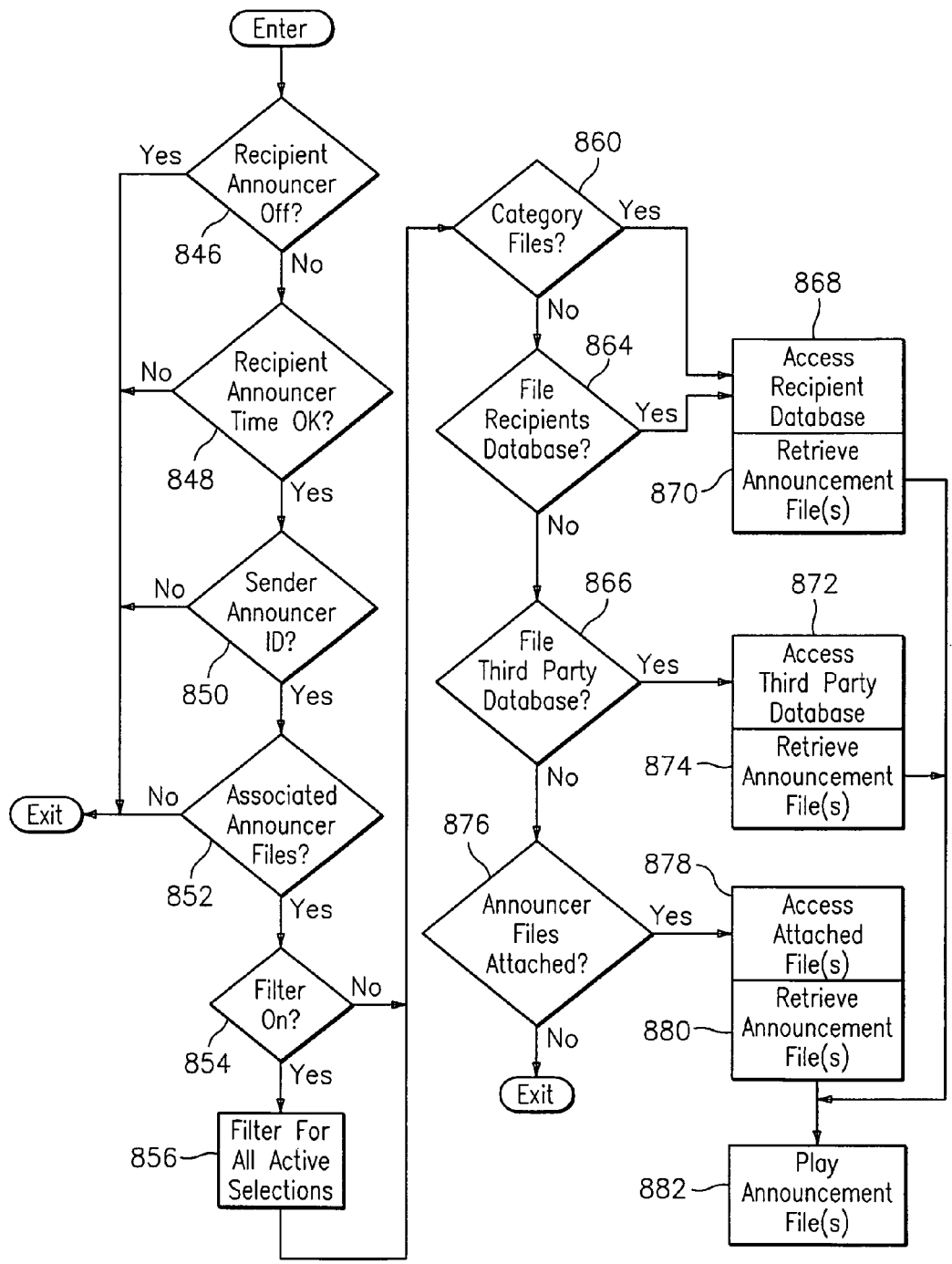
FIGS. 15a and 15b are a flow diagram of the receiver announcer application program of the terminal illustrated in FIG. 2.
Figure 15B:
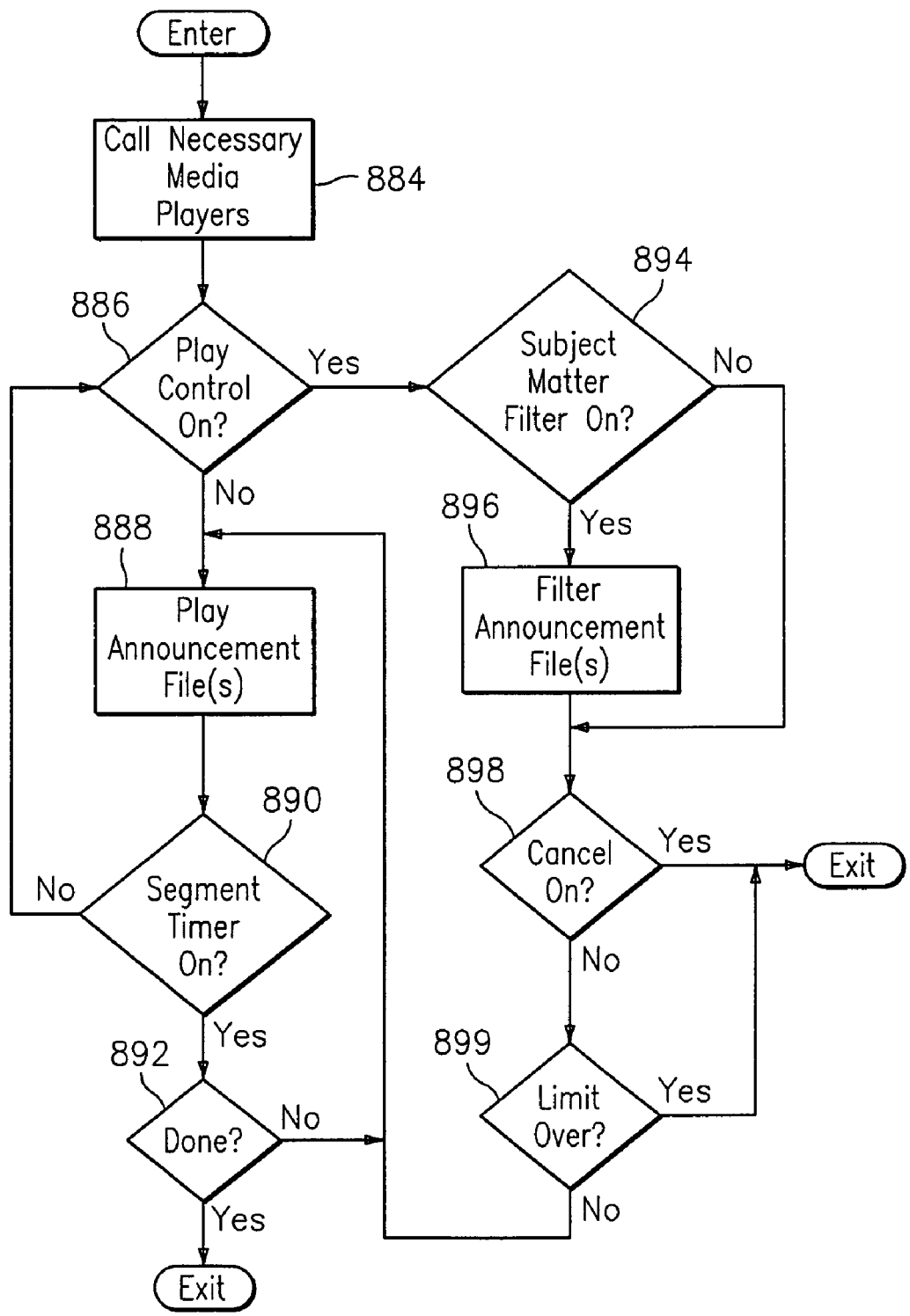

FIGS. 15a and 15b will now be more fully detailed in explanation of the recipient announcer application program that is entered in step 846 from the detection of a received email by program portion 800 of the email application program 11 and step 208 in FIG. 4B. The program tests whether the recipient announcer function is turned on in step 846 and whether the recipient announcer program is outside its allowed operational time in step 848. If either of these tests is passed the email is allowed to continue to email application program 11 where it is handled in a conventional manner. If both tests are failed, the email is diverted and tested in steps 850 and 852 to determine the operation. The received email is examined in step 850 to determine if a sender announcer ID is found in the header and in step 852 to determine if the email has any announcement files associated with it.

If the information in the header indicates that the answer is yes and there are announcement files, then the program will continue to its subsequent parts to determine what those announcer files are and how to play them for the recipient. If there are no announcer files associated with the email or the email is not an announcer email, the program exits and returns to the point from which it exited the announcer application program in step 212 of FIG. 4B. While the information concerning the associated announcement files may be conveyed anywhere in the email, or for that matter in an attached or even a separate associated file, it is very convenient to convey them in the email header in a standardized format.

The program then checks in step 854 whether any of the filters are on and, if the test is affirmative, the email is filtered in step 856 for all criteria for each filter that is active. Those emails that are filtered out are returned to the email application program 11 for conventional handling. For those emails that pass the active filtering, a series of tests in steps 860, 864, 866 and 87 are entered to determine where the announcement file to be played is located. In step 860, the category type of announcement file is checked for in the email. If found, the program will access the data base of the recipient in step 868 and retrieve the announcement file in step 870 that the recipient has associated with that category. Additionally, if the information in the header indicates that the announcement file(s) reside in the data base of the recipient in step 864, then the program accesses those data bases in step 868, finds the associated files and retrieves those announcer file(s) in step 870. In step 876 the program determines if the announcement file is associated as an email attachment, and if confirmed, retrieves that the attachment(s) in steps 878 and 880 in a conventional manner. The retrieved announcement file(s) can be an audio, video, or text file(s), or combinations thereof, and are then transferred to step 882 where the appropriate audio, video, text, or combinations thereof, media players for the file(s) are called and the audio, video, text, or combination thereof, announcements are made, respectively. The recipient may also be given the option to save the announcement file to add the announcement file to their library or forward the announcement file to another recipient. When finished announcing an email, the program returns to the point from which it exited the announcer application program in step 210 of FIG. 4B.

If the announcement file cannot be accessed through steps 864, 866 or 876, or the announcement file has been corrupted/unplayable, then system will provide an indication that an email announcement was included but could not be correctly played. This prevents the recipient announcer application from locking up trying to locate or play an announcement file that cannot be resolved.

FIG. 15b is an exemplary implementation of step 882 of FIG. 15a when the system has the option of a play control. The program enters when all of the announcement files have been retrieved and the necessary media players for announcing these files have been called in step 884. If the play control function has not been turned on, the program continues to step 888 where they announcement files are played for a segment of time determined by step 890. After each segment is played, the timer in step 890 will time out and the program will loop back to determine if the Play control is on in step 886. During the on time of the segment timer, the announcement files will be played by looping through steps 888, 890 and 892 until all files have been played. The program will then exit to step 210 in FIG. 4.

When the play control is on, the program will transfer to step 894 where the test of whether a subject matter filter has been selected is made. If the subject matter filter has been selected, the announcement file is filtered in step 896 for the subject matter desired whether is be inappropriate language, certain themes, etc. before continuing. Next the program in step 898 determines if the cancel function has been made active. If the user has decided to cancel the rest of an announcement, the program exits. Otherwise, the program continues to a test in step 899 for a time limit on the announcement. If the announcement has exceeded the predetermined limit that has been set for it, then the program exits from the yes branch of the test. If the time limit set for the announcement has not been reached, then the program will loop back to step 888 where another segment of the announcement is played. The program will check for the time limit and the end of every play segment through the path of steps 886, 894, 896, 898, and 899, until the announcement ends or the time limit is reached at which point the program will exit.

Figure 10:
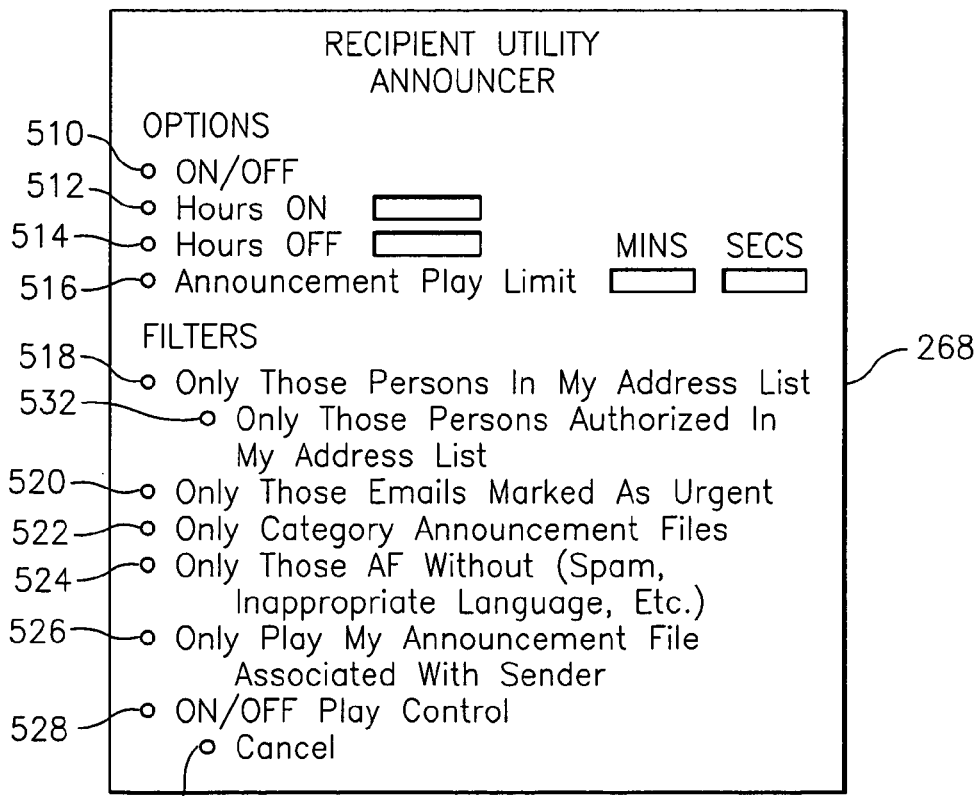
FIG. 10 is a pictorial representation of the interactive screen control for the recipient announcer application program illustrated in FIG. 15.

FIG. 10 is a representative pictorial of the interactive screen 268 that is displayed when the utility program for the recipient announcer application program is called. This screen allows the user to command the recipient announcer program to control the playing of the associated announcement files and provides defaults and other optional functions. The screen 268 provides a series of selection buttons 510-530 that can be selected by clicking on them with the cursor 110 of the terminal 100. The status of each button is then stored in the memory of the terminal 100 where the recipient announcer application program can read that status and respond accordingly.

The user may initially select with the screen 268 on, the options of whether the recipient announcer function is off or on with selection button 510, whether there are certain times of the day when the recipient announcer function should be on with selection button 512, or whether there are certain times of the day when the recipient announcer function should be off with selection button 514. Corresponding entry blocks to the options allow the user to select the hours desired for the particular option. The selection button 510 overrides the selection buttons 512 and 514 so that the user may turn the recipient announcer function on or off for time periods chosen by the user without having to reset the normal default hours.

Other functions the recipient can use to control the play of the sender associated announcement files are a series of filters chosen by select buttons 518-526 and 532. An email may be examined for its characteristics and those emails having characteristics that the recipient has chosen to filter out will not have their announcement files played. The emails that are filtered out will be returned to the email application program 11 where they will be handled normally by that program. Select button 518 will filter out all emails from persons not in the address book of the email application program 11 of the recipient. Selecting button 532 will filter out emails from all senders not in the address book of the recipient and those in the address book who not authorized to send emails with associated announcement files. Selecting button 520 will only allow playing those announcement files associated with emails marked as urgent. Selecting button 522 will filter the emails for those with category indications, whether with associated announcement files or without. This filter will then play the announcement file of the recipient, if any, associated with the category indicated by the sender. Another associated filter is chosen by selecting button 526 which will play the announcement file that the recipient has associated with the sender, if any.

After the options and filters have selected the set an email that will have its associated announcement files or the recipient's announcement files played, the user may also select how these announcement files are played with a play control selection button 528. If the section button 528 is off, there is no play control and the program will play the announcement files as they are found. However, if the play control is on by selecting button 528, then the user may also select a cancel button 530 to immediately end the play of an announcement file while it is being played. Additionally, before an announcement file is played and if the play control in on, a filter may be selected by button 524 to eliminate those announcement files with objectionable content. Also, if the play control is on, the user may select the maximum time an announcement file may play by selecting button 516 and by entering a time limit with input device 110 in the corresponding entry blocks for mins. and secs.

As discussed above, the filtering and blocking of announcement files may also be performed by email servers 28 and 30 in the intranets 24 and 26. This allows an organization to apply filters controlling the distribution of announcement files. The announcer administrator programs executing on servers 28 and 30 include associations and filters as discussed above. The sending and receiving of announcer files may be permitted or prohibited based on attributes of the sender, receiver and/or the electronic message. For example, announcement files may be permitted for internal emails (e.g., recipient addresses on the intranet) but blocked for external email addresses. Thus, the control of announcement files, either by the sender or the recipient, may be executed at the network level by an announcer administrator program executing on an email server applying blocking and routing criteria based on attributes of the electronic message.

As described above, both the sender and the receiver may associate announcement files on an individual basis. For example, Sam may associate file A with Randy, and Randy may associate file B with Sam. When Sam sends an email to Randy, the announcer application must determine which announcement file to play indicating receipt of the email. In embodiments of the invention, the recipient's associated announcement file overrides the sender associated announcement file such that the recipient controls announcements at their system. The recipient may select a function to turn-off the override feature so that the sender associated announcement file is played. Further, the recipient may impose conditions on the override ability. For example, the recipient may wish to have announcement files in certain categories (e.g., emergency category) played, regardless of the recipient's override instructions. Thus, the receiver can customize which announcement files are to be played based on the sender (e.g., individual control) or the situation (e.g., based on category of the announcement file).

The email announcer application may also have administrative controls that are established by the installer or maintainer of the applications. These administrative controls may be established and altered only by administrative personnel (e.g. IT personnel). Such controls may be implement on individual terminals or on email servers. These controls establish global controls such as acceptable content, size and frequency of announcement files. Further, override management may be controlled through the global controls. For example, in a business organization, rank within the entity may be used to resolve a conflict between a sender announcement file and a recipient announcement file (e.g., the higher ranking individual's announcement file is played).

The recipient terminal may generate a notification to the sender terminal that the associated announcement file was played at the recipient terminal. In the event that a sender's associated announcement file is not played at the recipient terminal, the recipient terminal may send notification of this event to the sender. In embodiments, the notification is a reply email to the sender stating that the sender associated announcement file was not played at the recipient terminal. In other embodiments, the notification is a reply email stating that the sender associated announcement file was not played and also indicating what announcement file was played. The recipient may block the transmission of the notification to the sender through a user option menu. Similarly, the sender may block receiving the notification from the recipient through a similar user option.

If a recipient is not present when an announcement file is played, embodiments allow the recipient to mark an email as unread or new so that the announcement file can be played again. Most email applications include a function for marking emails as unread or new. Alternatively, embodiments of the invention include an announcement icon or button that may be used when an e-mail is selected. To play an announcement file, the recipient selects an email in their inbox and then selects the announcement button. This causes the announcer application to play the announcement file.

Announcement files may be subject to existing digital rights management (DRM) features to prevent unauthorized distribution of the announcement files. As described above, embodiments of the invention allow a user to purchase announcement files. These announcement files may be encoded for use on a single terminal, a limited time, a limited number of transmissions, etc. Those skilled in the art will recognize various DRM mechanisms that may be used on the announcement files.

The sender associated announcement files in other embodiments advantageously provide a marketing method. The sender associated announcement files are a convenient and inexpensive way for makers of various products and services to communicate with consumers and theoretically receive immediate feedback of their efforts.

Figure 16:
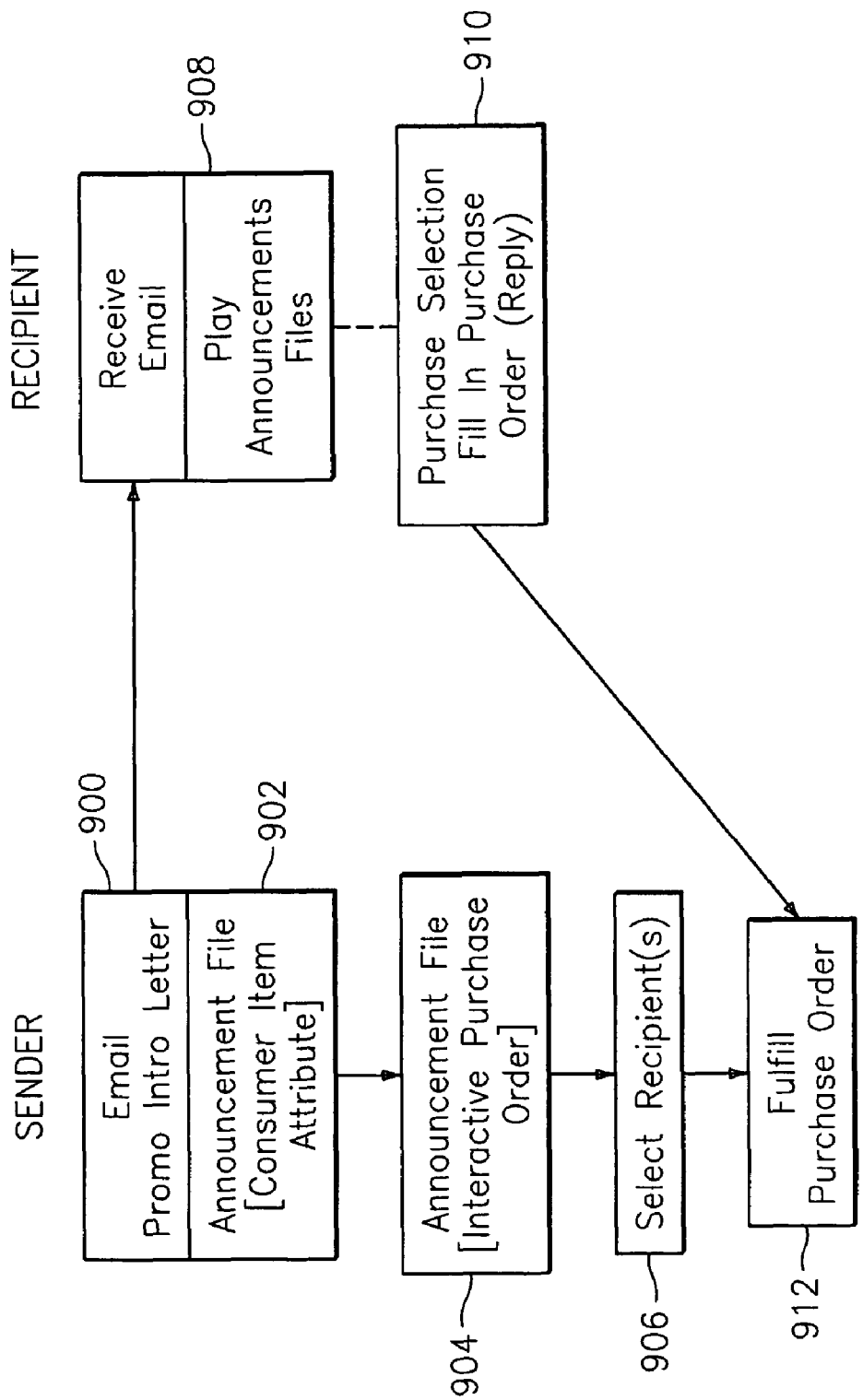
FIG. 16 is a functional block diagram of an exemplary method of doing business over the internet with sender associated announcement files.

With reference to FIG. 16, there is illustrated a process where the sender of an email composes an introductory or promotion letter 900 for its product. The sender then associates, by the methods disclosed herein before, an announcement file 902 that contains a consumer item attribute. Optionally, the sender can also associate a second announcement file 904 that is an interactive purchase order. The email 900 with the associated announcement files 902, 904 is then sent to a particular recipient, or more conveniently is mass mailed to a group of recipients that have been selected in step 906 for their propensity to purchase the product, either by their demographics, their zip code, income level, profession, previous survey, or the like. The recipient then receives the email and the announcement files are played for him in step 908. The recipient (consumer) may then purchase the product with the interactive purchase order 904 by filling it out and replying to the marketing email 910. When the sender or marketer receives the filled in purchase order, it fills the purchase order by sending the merchandise purchased in step 912 and thereby completes the e-business transaction. This transactional scheme can be advantageously used for a variety of consumer or commercial items and services.

Figure 17:
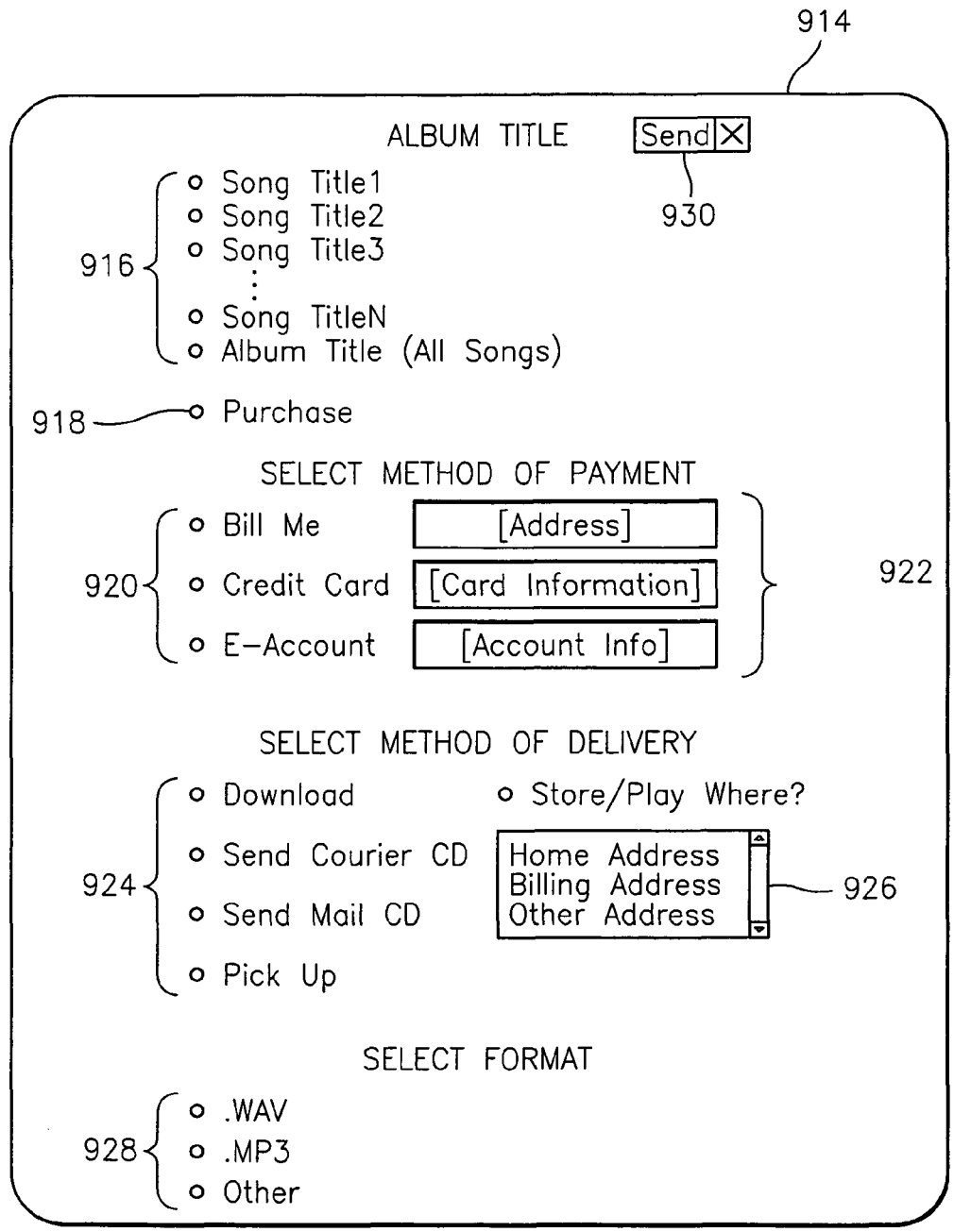
FIG. 17 is a graphical representation of an interactive screen display for a recipient viewing a purchase order for the method illustrated in FIG. 16.

Exemplary embodiments of the general marketing technique will be more fully described for a particular item. The item will be a music album that a record company is marketing. In the prior described step of associating a consumer product attribute, the announcement file 902 will contain the graphics file of a picture of the front of the front cover of the album, and optionally the back cover or other informational or promotional background on the group, making of the album, or the like. The announcement file may also include a portion of a song from the album. An interactive order form, for example the order form 914 illustrated in FIG. 17, is then associated as the second announcement file 904 and the email 900 and associated announcement files 902, 904 sent to the recipient(s).

After the announcement files are played by displaying the album cover (and optionally a portion of a song) and then displaying the interactive order form 914, a recipient decides whether to purchase one or more songs of the album by clicking on the interactive bullets in the order form 914 and by filling in the other information in the form. The bullets 916 in the interactive order form 914 allow the purchase of individual songs of the album or the entire album. The bullet 918 allows the recipient to confirm the purchase. The bullets 920 allow the recipient purchaser to select the method of payment (bill me, credit card, e account, etc.) and provide entry boxes 922 for the information necessary to complete the credit transaction. The bullets 924 allow the recipient purchaser to select the method of delivery of the purchased item (download, CD courier, CD mail, pick up at the music store, etc.) and provide entry boxes 926 for the information necessary to complete the transaction. Additionally, the bullets 928 allow the recipient purchaser to select the format of the purchased item (.wav file, .mp3 file, or other e audio format). The recipient then provides immediate feedback to the marketer by hitting the send button 930 of the form 914 and replying to the sender marketer in an email having the purchase order information filled in. Subsequently, the order is fulfilled and the transaction is completed in step 912. Analogous processing may be used for other types of media such as movies, where the announcement file may include an image of the movie promotional poster.

This technique and system provides a very facile method of ordering one or more songs from an album, or the entire album, and paying for them. The ordered items can be played at the time they are ordered or stored for later play, and can be stored in different formats allowing subsequent play by a direct audio player, a multimedia player of a PC, an IPOD type player device, cellular telephone, or the like. This technique is also a consumer friendly and flexible marketing method for the consumer as it allows the notice of the newest products at a range of price points and an inexpensive sampling of a product before purchase with the convenience of the internet. For example, with this method the recipient consumer may listen to one or more of the songs of a new album or of an album by a new group before making a choice about buying the album.

Another marketing area to which substantial marketing resources are directed is the promotional product placement. Selected consumers or recipients are chosen, for their propensity to purchase a product, either because of their demographics, their zip code, income level, profession, a previous survey, or the like, to receive products without charge with few or no additional conditions. Promotional placement are based upon the marketing realization that trying new or improved, less expensive, or differently featured products appeal to many consumers and if they try such products a certain number of them will continue to buy and use the placed products. The challenge, particularly as the item promoted becomes more expensive, is to find those consumers whose probability to continue to use the product is greater than the original filter.

Figure 18:
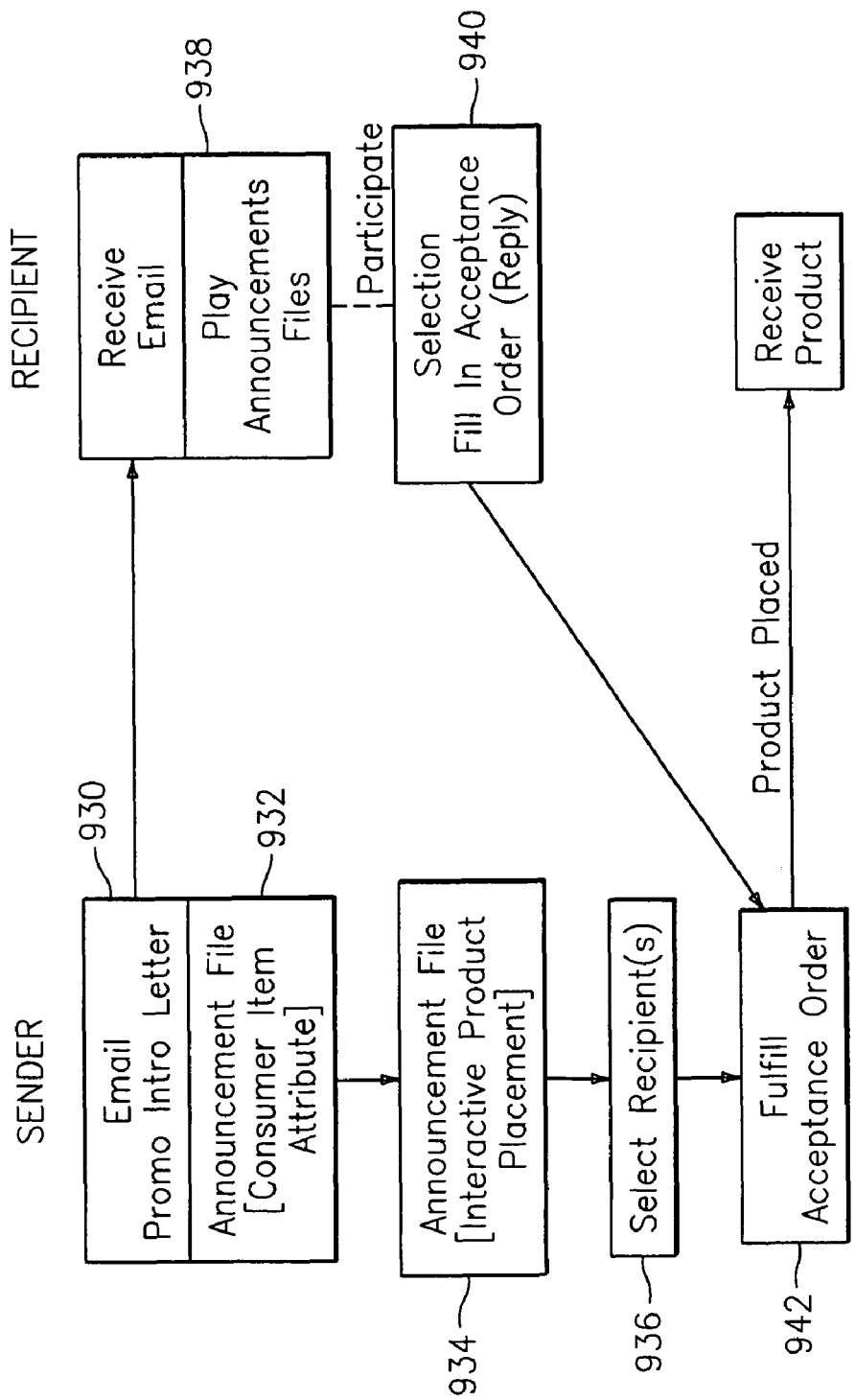
FIG. 18 is a functional block diagram of another exemplary method of doing business over the internet with sender associated announcement files.

With reference now to the FIG. 18, there is illustrated a process for product placement where the sender of an email composes an introductory or promotion letter 930 for its product. The sender then associates, by the methods disclosed herein before, an announcement file 932 that contains a consumer item attribute. Optionally, the sender can also associate another announcement file 934 that is an interactive product placement response. The email 930 with the associated announcement files 932, 934 is then sent to a particular recipient, or more conveniently is mass mailed to a group of recipients that have been selected for their propensity to purchase the product in step 936. The recipient then receives the email and the announcement files are played for him in step 938. The recipient may then accept the product placement with the interactive product placement response 934 by filling it out and by replying to the product placement email. When the sender or marketer receives the filled in product placement acceptance, it fills the acceptance order by sending the merchandise placed in step 942 and thereby completes the e-business transaction. This transactional scheme can be advantageously used for a variety of consumer or commercial items and services.

Figure 19:
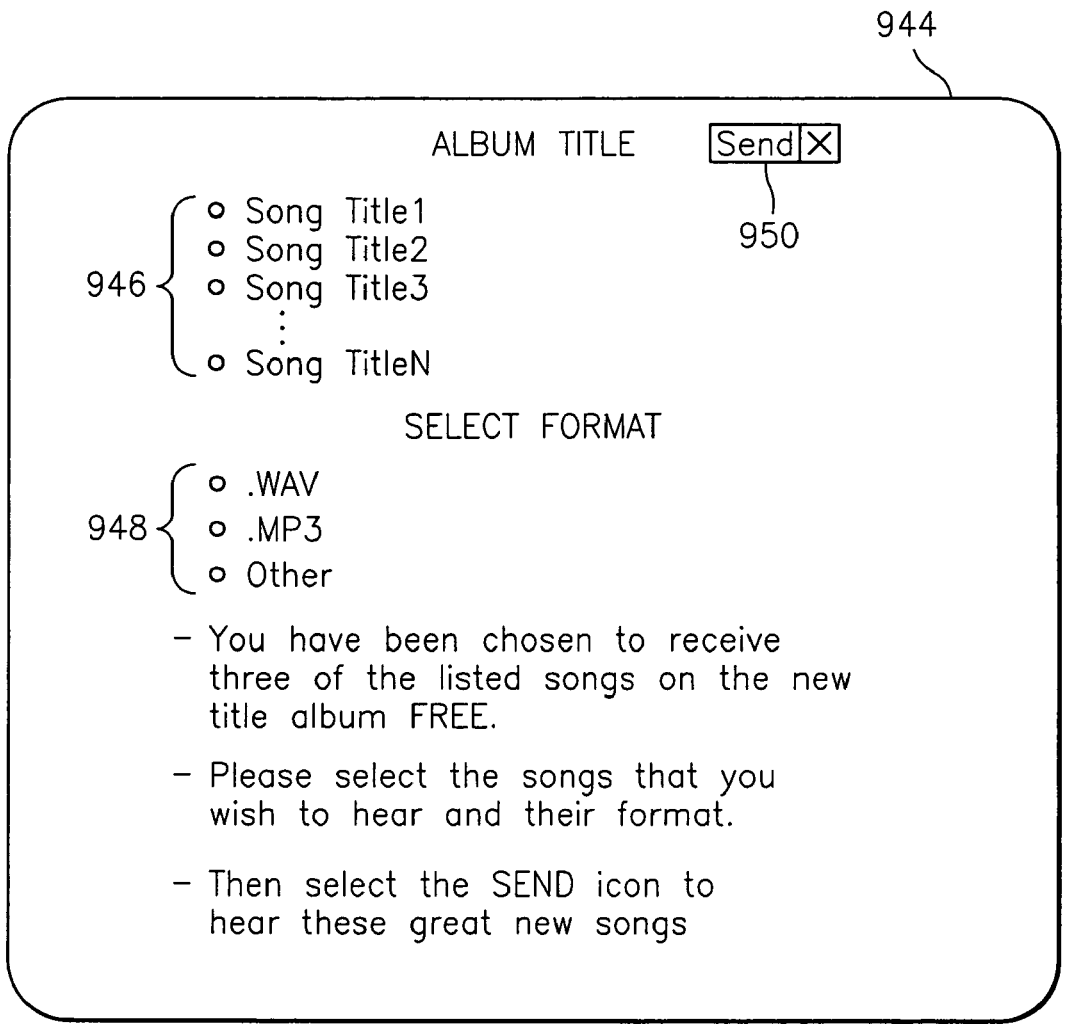
FIG. 19 is a graphical representation of an interactive screen display for a recipient viewing a product placement offer for the method illustrated in FIG. 18.

Exemplary embodiments of the general marketing technique for product placement will now be more fully described for a particular item. The item will be a music album that a record company is marketing. In the prior described step of associating a consumer product attribute, the announcement file 932 will contain the graphics file of a picture of the front of the front cover of the album, and optionally the back cover or other informational or promotional background on the group, making of the album, or the like. An interactive product placement form, for example the product placement form 944 illustrated in FIG. 19, is then associated as the second announcement file 934 and the email 930 and the associated announcement files 932, 934 sent to the recipient(s).

After the announcement files are played by displaying the album cover and displaying the product placement form, a recipient decides whether to accept one or more songs of the album as a promotional gift by clicking on the interactive bullets in the product placement form 944 and by filling in the other information in the form. The bullets 946 in the interactive product placement form allow the receipt of individual songs of the album. Additionally, the bullets 948 allow the recipient to select the format of the downloaded item (.wav file, .mp3 file, or other e audio format). The recipient then provides immediate feedback to the marketer by hitting the send button 950 and replying to the sender marketer in an email having the interactive order information filled in. Subsequently, the acceptance order is filled by downloading a particular song, or a number of the songs, in step 942 to complete the transaction.

This technique and system provide a very facile method of product placement for one or more songs from an album. This technique is also a consumer friendly and flexible marketing method for the consumer as it allows the notice of the newest products and a free sampling of a product before purchase with the convenience of the Internet. For example, with this method the consumer may listen to one or more of the songs of a new album by a new group before making his choice about buying the album.

Another marketing area to which substantial marketing resources are directed is the product survey. Selected consumers or recipients are chosen to review products and provide feedback about what they like or dislike. Product surveys are based upon the marketing realization that trying new or improved, less expensive, or differently featured products appeal to many consumers and if they try such products a certain number of them will continue to buy and use the products. One challenge is to determine by the questions in a survey why some will continue to buy and use a product and others will not.

Figure 20:
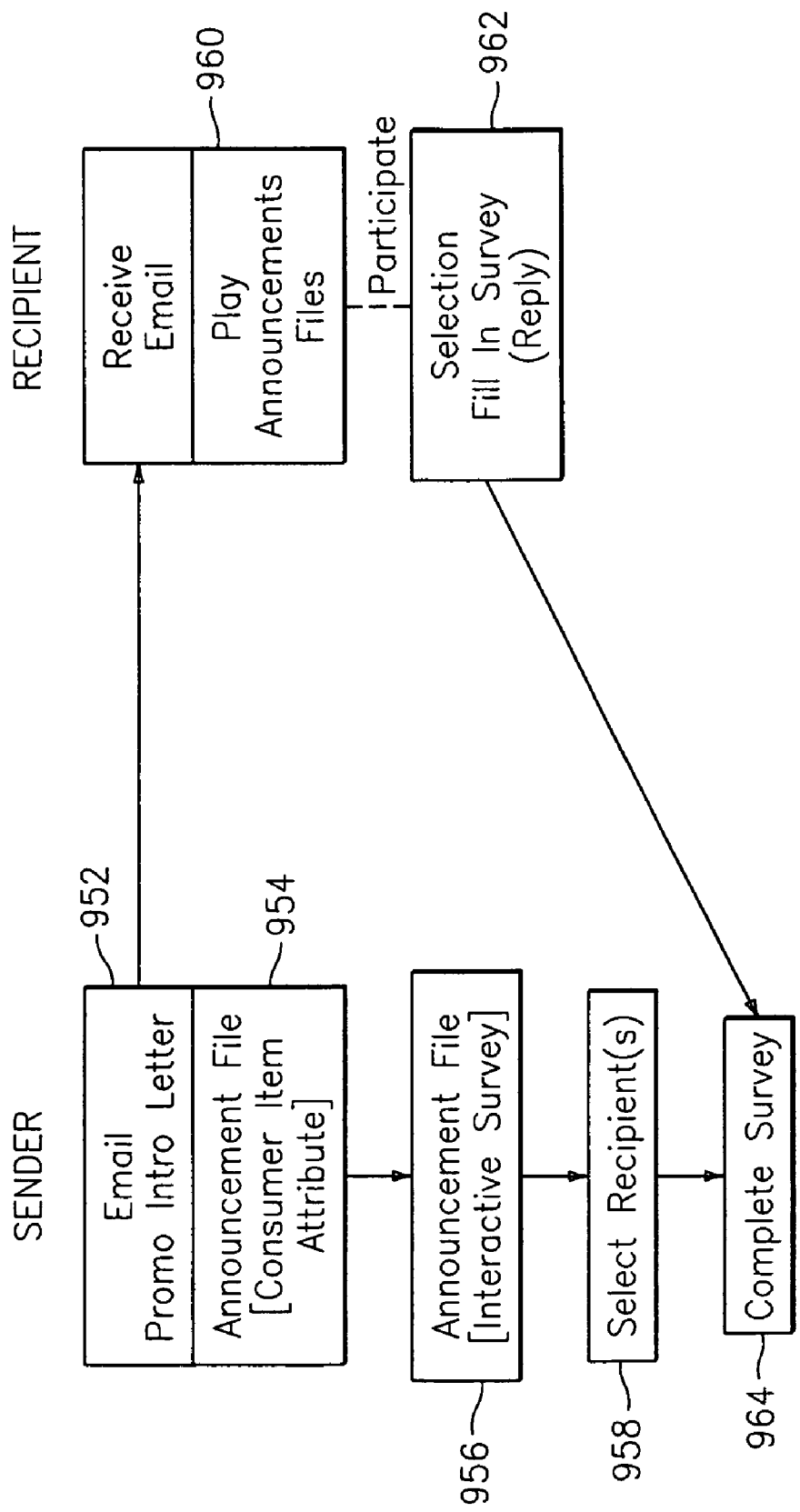
FIG. 20 is a functional block diagram of another exemplary method of doing business over the internet with sender associated announcement files.

With reference now to the FIG. 20, there is illustrated a process for a product survey where the sender of an email composes an introductory or promotion letter 952 for its product. The sender then associates, by the methods disclosed herein before, an announcement file 954 that contains a consumer item attribute. Optionally, the sender can also associate another announcement file 956 that is an interactive product placement response. The email 952 with the associated announcement files 954, 956 is then sent to a particular recipient, or more conveniently is mass mailed to a group of recipients that have been selected in step 958 for their propensity to purchase the product, either by their demographics, their zip code, income level, profession, previous survey, or the like. The recipient then receives the email and the announcement files are played for him in step 960. The consumer may then participate in the product survey with the interactive product placement response 956 by filling it out and by replying to the product survey email in step 962. When the sender or marketer receives the filled in survey form it may combine the data from the recipient with others and thereby completes the e-business transaction. This transactional scheme can be advantageously used for a variety of consumer or commercial items and services.

Figure 21:
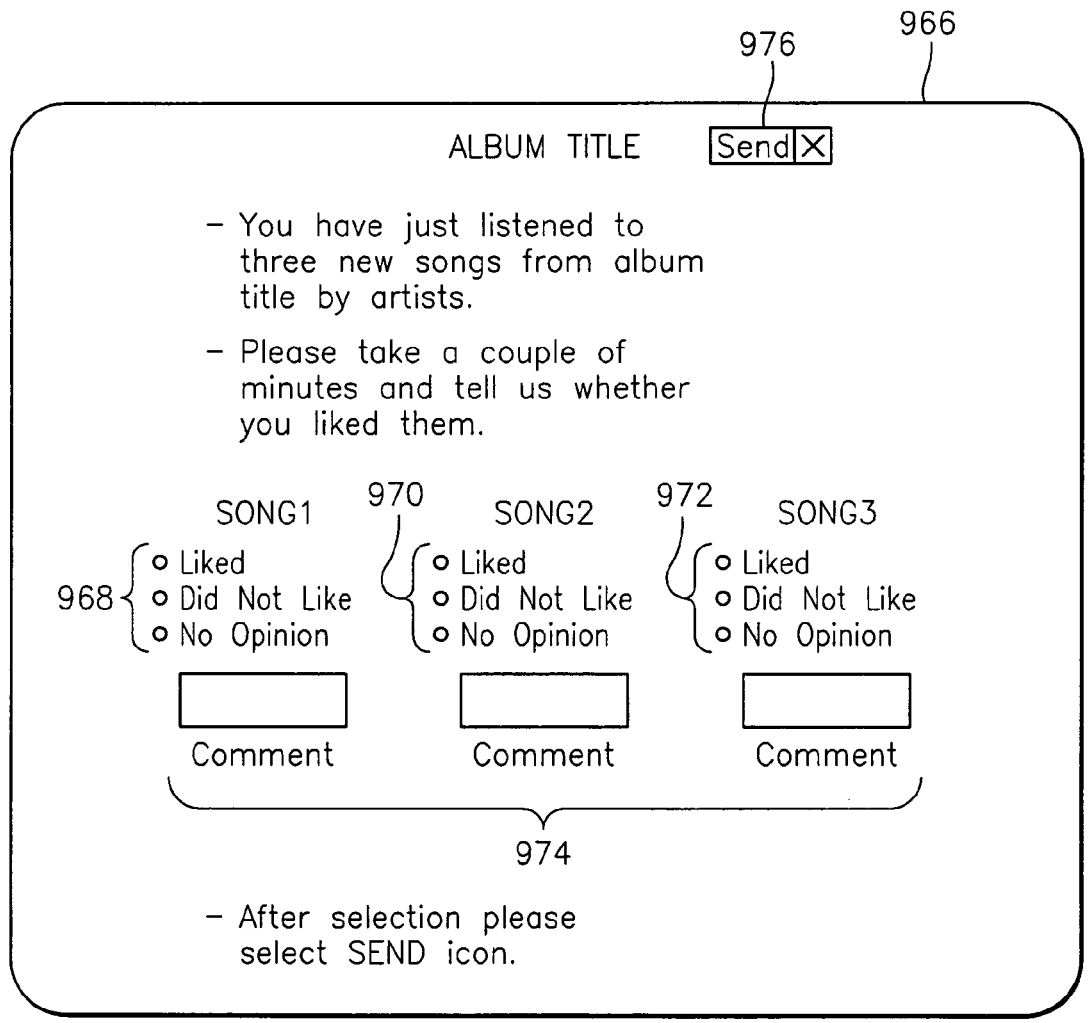
FIG. 21 is a graphical representation of an interactive screen display for a recipient viewing a product survey for the method illustrated in FIG. 20.

Exemplary embodiments of the general marketing technique of a product survey will now be more fully described for a particular item. The item will be a music album that a record company is marketing. Advantageously, this survey technique may be combined with the previously described product placement example and be sent to those recipients that responded by accepting the product placement or sample of three songs of the album. In the prior described step of associating a consumer product attribute, the announcement file 954 will contain the graphics file of a picture of the front of the front cover of the album, and optionally the back cover or other informational or promotional background on the group, making of the album, or the like. An interactive product survey form, for example the product survey form 966 illustrated in FIG. 21, is then associated as the second announcement file 956 and the email 92 and the associated announcement files 954, 956 sent to the recipient(s).

After the announcement files are played by displaying the album cover and displaying the survey form, a recipient decides whether to participate in the survey by clicking on the interactive bullets in the product survey form and by filling in the other information in the form. The bullets 968, 970 and 972 in the product survey form 966 allow the selection of different opinions (like, did not like, no opinion) about each of three songs of the product placement. Further, entry boxes 974 allow a short opinion of the recipient to be entered for each song. The recipient then provides immediate feedback to the marketer by hitting the send button 976 and replying to the sender marketer in an email having the interactive survey information filled in. Subsequently, the survey data from this recipient can be combined with data received form others surveyed to complete the transaction.

This technique and system provides a very facile method for a product survey for one or more songs from an album. This technique is also a consumer friendly and flexible marketing method for the consumer as it allows the feedback of his opinion with the convenience of the internet.

The marketing embodiments described with reference to FIGS. 16-21 allow providers of goods and services to capture a recipient's attention through the use of announcement files that are played upon receipt of an e-mail. Recipients may not wish to receive such emails, with marketing-type announcement files. Thus, the recipient controls discussed above may also have controls to override all announcement files unless the sender is an entity in the recipient's address book. This would allow the recipient the opportunity to add senders to their address book from whom they wish to receive announcement files, including marketing announcement files. Further, controls on marketing announcement files may be implemented at the email server level such as at a LAN email server. The LAN email server may detect the announcement file or the sender as being related to marketing, and block the announcement file, or the entire email. Thus, overrides to marketing announcement files may be implemented at a network, group or individual level using filters provided in the announcer application.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the embodiments. The exemplary embodiments can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Further, the processes described are not necessarily to be performed only in the sequence illustrated or each step only at the time indicated. Therefore, it is intended that the invention not be limited to the particular embodiments disclosed as the best mode contemplated for carrying out this invention, but that the invention will include all embodiments falling within the scope of the appended claims.

What is claimed is:

1. A method, performed between a sending computer terminal and a recipient computer terminal, of obtaining a response to associated announcement files, the method comprising:

associating, by an email program of the sending computer terminal, a first announcement file including an attribute of a tangible item with an email;

associating, by the email program of the sending computer terminal, an interactive information file with the email;

sending, by the email program of the sending computer over a network, the email with the associated announcement file and the associated interactive information file to a recipient; and receiving, by an email program of the recipient computer terminal over the network, the email with the associated announcement file and the associated interactive information file;

the announcement file causing presentation, by the recipient computer terminal, of the attribute of the tangible item to the recipient upon receipt of the email by the recipient;

the interactive information file causing presentation, by the recipient computer terminal, of the interactive information file to the recipient upon receipt of the email by the recipient;

wherein the tangible item is an album and the attribute is a picture of at least a front cover of the album;

wherein the announcement file includes at least a portion of a song from the album, the announcement file being played upon receipt of the email with the associated announcement file and the associated interactive information file by the email program of the recipient computer terminal indicating to the recipient that the email with the associated announcement file and the associated interactive information file has arrived;

wherein associating the interactive information file includes inserting the interactive information file as at least part of the email;

wherein the interactive information file is a purchase order form for the tangible item.

2. The method of claim 1 wherein associating the interactive information file includes associating a second announcement file.

3. The method of claim 1 wherein associating the interactive information file includes inserting the interactive information file as an attachment.

4. The method of claim 1 further comprising:

receiving a reply to the interactive information file from the recipient of the interactive message file, the reply including selections by the recipient.

5. The method of claim 1 wherein the interactive information file is a product placement offer for the tangible item.

6. The method of claim 1 wherein the interactive information filed is a product survey form for the tangible item.

7. A computer program product for obtaining a response to associated announcement files, the computer program product comprising:

a storage medium readable by a processing circuit and storing instructions for execution by the processing circuit for facilitating a method comprising:

associating a first announcement file including an attribute of a tangible item with an email;

associating an interactive information file with the email; sending the email with the associated announcement file and the associated interactive information file to a recipient; and the announcement file causing presentation of the attribute of the tangible item to the recipient upon receipt of the email by the recipient;

the interactive information file causing presentation of the interactive information file to the recipient upon receipt of the email by the recipient;

wherein the tangible item is an album and the attribute is a picture of at least a front cover of the album;

wherein the announcement file includes at least a portion of a song from the album, the announcement file being played upon receipt of the email with the associated announcement file and the associated interactive information file by a recipient email program indicating to the recipient that the email with the associated announcement file and the associated interactive information file has arrived;

wherein associating the interactive information file includes inserting the interactive information file as at least part of the email;

wherein the interactive information file is a purchase order form for the tangible item.

8. The computer program product of claim 7 wherein associating the interactive information file includes associating a second announcement file.

9. The computer program product of claim 7 wherein associating the interactive information file includes inserting the interactive information file as an attachment.

10. The computer program product of claim 7 further comprising:

receiving a reply to the interactive information file from the recipient of the interactive message file, the reply including selections by the recipient.

11. The computer program product of claim 7 wherein the interactive information file is a product placement offer for the tangible item.

12. The computer program product of claim 7 wherein the interactive information filed is a product survey form for the tangible item.

* * * * *